United States Patent [19]
Smith et al.

[11] Patent Number: 6,128,649
[45] Date of Patent: Oct. 3, 2000

[54] DYNAMIC SELECTION OF MEDIA STREAMS FOR DISPLAY

[75] Inventors: Keith M. Smith; Russell W. Pretty, both of Ottawa, Canada

[73] Assignee: Nortel Networks Limited, Montreal, Canada

[21] Appl. No.: 08/867,624

[22] Filed: Jun. 2, 1997

[51] Int. Cl.[7] .................................................. H04N 7/14
[52] U.S. Cl. ................... 709/217; 348/15; 348/17
[58] Field of Search .................. 348/14–20; 395/200.47, 395/200.34; 379/202; 370/260, 235, 468

[56] References Cited

U.S. PATENT DOCUMENTS

| | | | |
|---|---|---|---|
| 4,531,024 | 7/1985 | Colton et al. ................................ | 179/2 |
| 5,003,532 | 3/1991 | Ashida et al. ............................. | 370/62 |
| 5,374,952 | 12/1994 | Flohr ........................................ | 348/12 |
| 5,382,972 | 1/1995 | Kannes ..................................... | 348/15 |
| 5,392,223 | 2/1995 | Caci ......................................... | 364/514 |
| 5,473,367 | 12/1995 | Bales et al. ............................... | 348/13 |
| 5,491,797 | 2/1996 | Thompson et al. ................. | 395/200.34 |
| 5,544,313 | 8/1996 | Schachnai et al. ................. | 395/200.01 |
| 5,574,934 | 11/1996 | Mirashrafi et al. ...................... | 395/800 |
| 5,615,338 | 3/1997 | Poole et al. ......................... | 395/200.4 |
| 5,657,096 | 8/1997 | Lukacs ..................................... | 348/15 |
| 5,682,460 | 10/1997 | Hyziak et al. ...................... | 395/200.47 |
| 5,737,011 | 4/1998 | Lukacs ..................................... | 348/15 |
| 5,760,838 | 6/1998 | Adams et al. ......................... | 348/460 |
| 5,768,280 | 6/1998 | Way ........................................ | 370/486 |
| 5,768,527 | 6/1998 | Zhu et al. .......................... | 395/200.61 |
| 5,778,187 | 7/1998 | Monteiro et al. ................... | 395/200.61 |

FOREIGN PATENT DOCUMENTS

| | | | |
|---|---|---|---|
| 0 581 101 A1 | 7/1993 | European Pat. Off. ......... | H04N 7/14 |
| 0 724 362 A1 | 1/1995 | European Pat. Off. ......... | H04N 7/15 |
| 0 669 765 A2 | 2/1995 | European Pat. Off. ......... | H04N 7/24 |
| WO 96/14711 | 11/1995 | WIPO ............................ | H04N 7/14 |

OTHER PUBLICATIONS

Database WPI, Section EI, Week 9707, Derwent Publications Ltd., London, GB; Class W01,AN 97–071568, XP002068243 & JP 08 317 366 A (Nippon Denki Eng KK) Nov. 29, 1996.

Herng–Yow Chen, Ja–Ling Wu, MultiSync: A Synchronization Model for Multimedia Systems, IEEE Journal on Selected Areas in Communications, vol. 14, No. 1, Jan. 1996.

Cosmos Nicolaou, An Architecture for Real–Time Multimedia Communication Systems, IEEE Journal on Selected Areas in Communications, vol. 8, No. 3, Apr. 1990.

Xiaobao Chen, End–to–End Synchronization Control Support for Multiservice Applications, Computer laboratory, University of Cambridge, Nov. 1995.

Ralf Steinmetz, Gerald Blakowski, A Media Synchronization Survey: Reference Model, Specification, and Case Studies, IEEE Journal on Selected Areas in Communications, vol. 14, No. 1, Jan. 1996.

*Primary Examiner*—Andrew I. Faile
*Assistant Examiner*—Reuben Brown
*Attorney, Agent, or Firm*—C. W. Junkin

[57] ABSTRACT

One or more streams from a number of real-time video streams available to be transmitted across a communications network, are selected for display on respective terminals of a first, and at least one other user. First, a policy of the first user for making the selection, is determined, the policy containing conditions to be evaluated, selectable by the first user. Then, which streams to select for the first user is determined dynamically by evaluating the current conditions according to the first user's policy. Only the selected streams are passed for display on the terminal of the first user, independently of selections made for passing to the other users. Dynamic selection from multiple streams enables the user to concentrate on the content not the form of presentation. Individual control of what is displayed, independent of what other users see, enables tailoring to video conferences to be handled more easily.

19 Claims, 28 Drawing Sheets

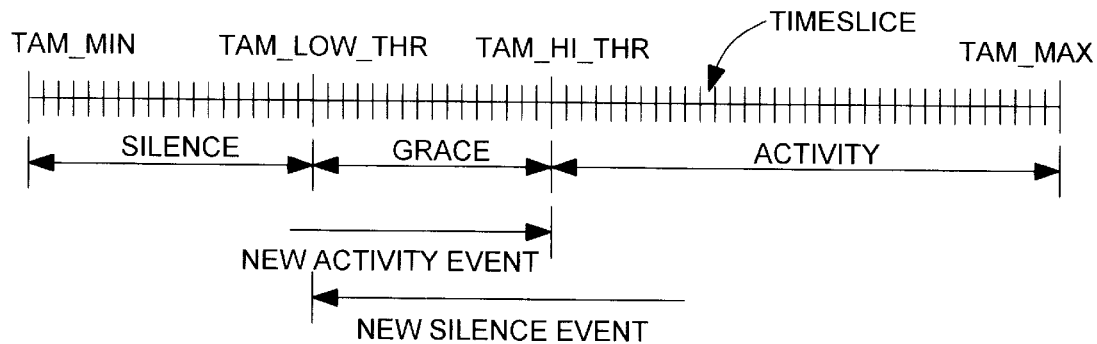
FIG. 17a(i)
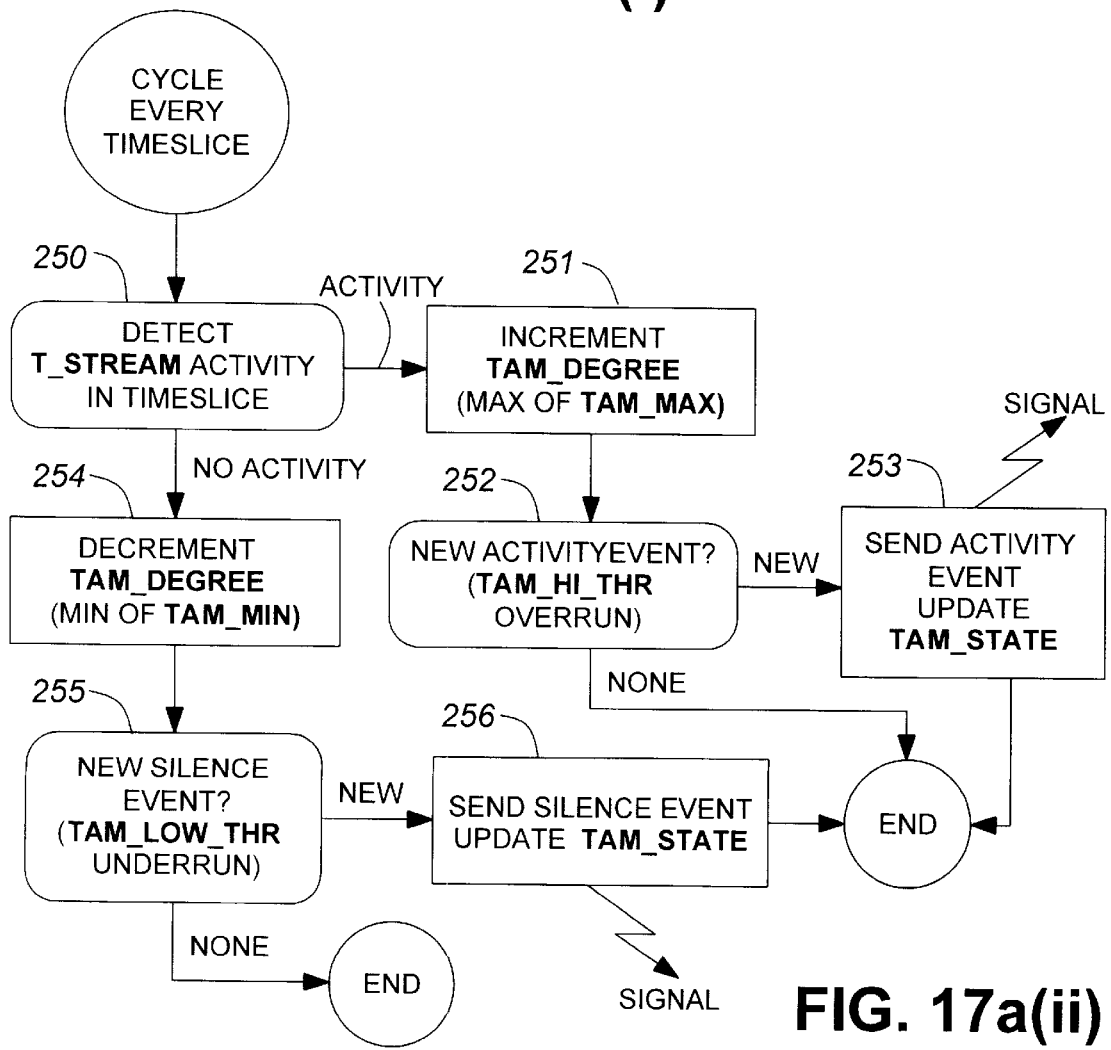
FIG. 17a(ii)

FIG. 17b(ii)

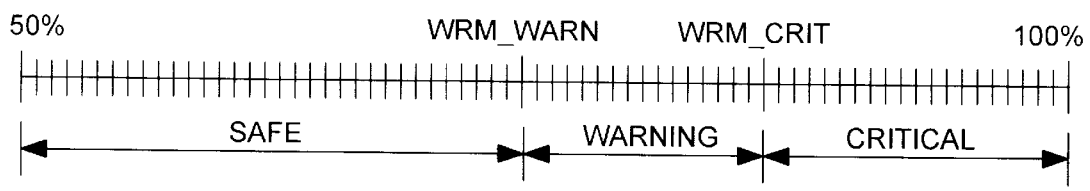
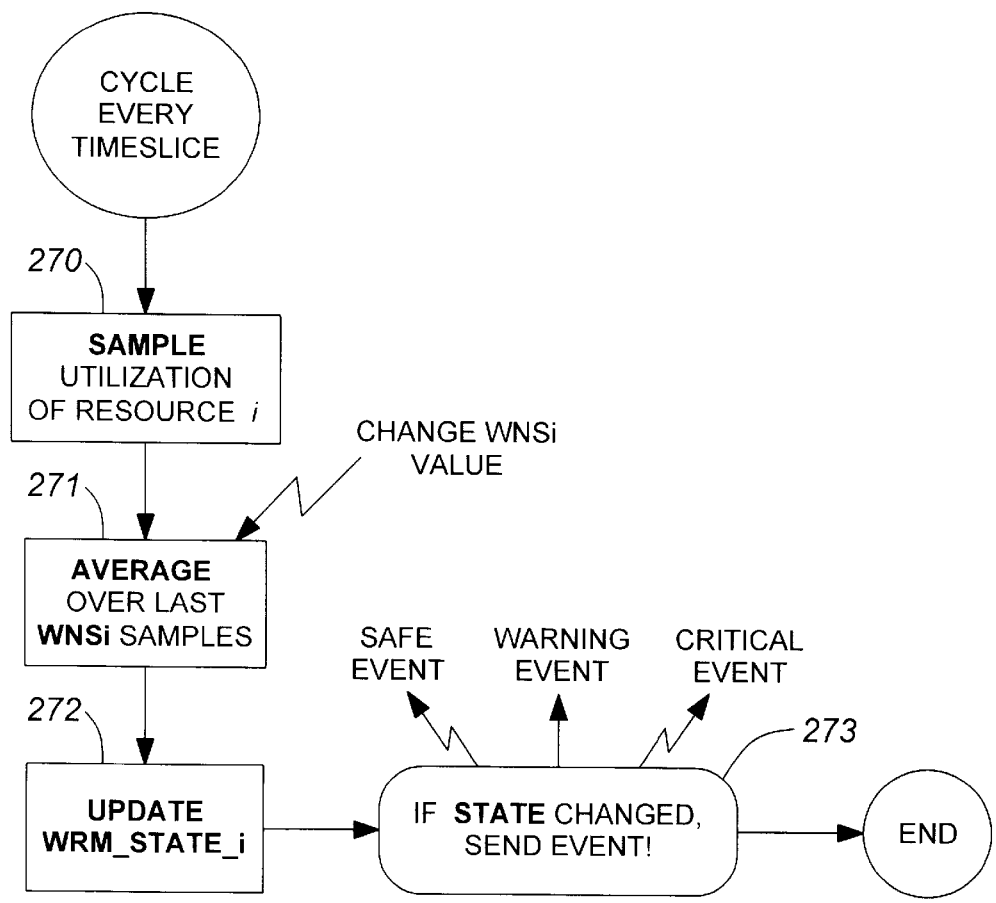

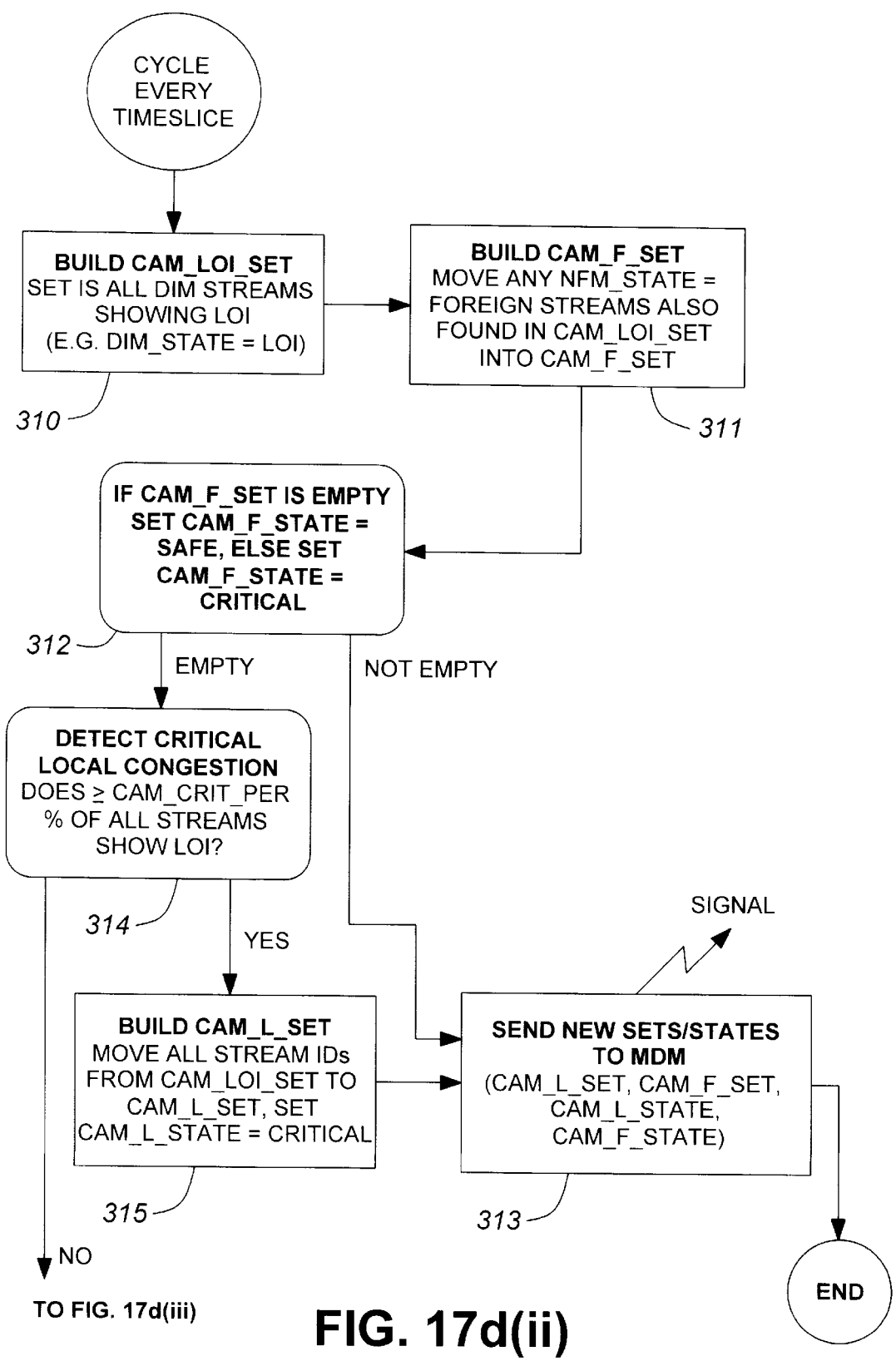
FIG. 17d(ii)

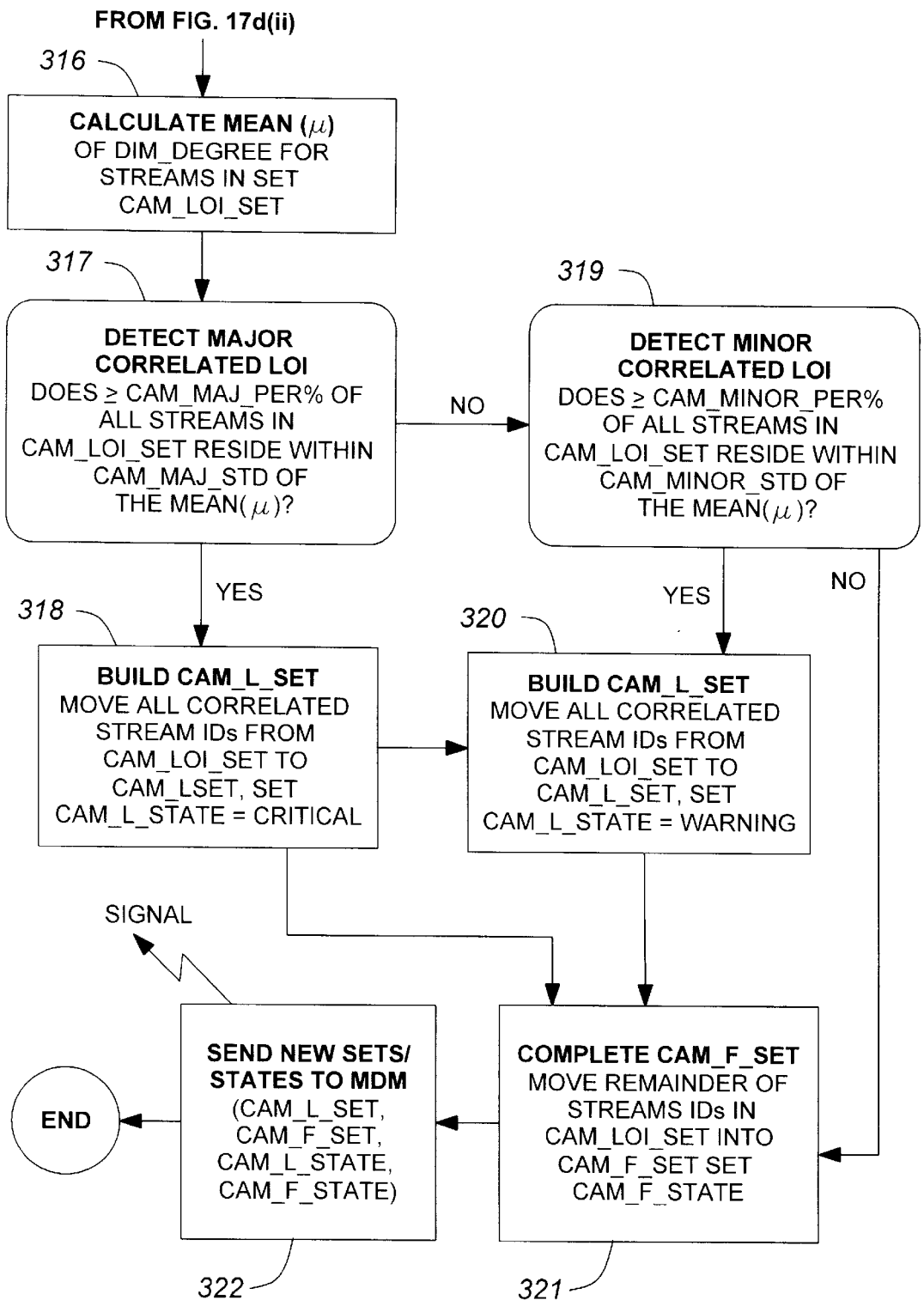
FIG. 17d(iii)

DYNAMIC SELECTION OF MEDIA STREAMS FOR DISPLAY

FIELD OF THE INVENTION

The invention relates to methods and apparatus for selecting for display one or more from a number of real-time media streams and to corresponding software, network nodes and terminals.

BACKGROUND TO THE INVENTION

Today's computing and network architectures readily support the transfer of text and still graphics or images. However, support for real-time media processing and networking has, until very recently, been realised entirely with overlay networks and service specific terminal equipment for displaying such media to the user. Voice telephony for example, is the most pervasive media specific network. Broadcast video and cable TV also use a dedicated transmission and switching infrastructure. In the same vein, high quality video conferencing requires leased lines and expensive dedicated equipment.

The most commercially successful segment of the video conferencing market has been for so-called "P×64" systems based on the ITU's H.320 series standards. Such systems aggregate from 2 to 30 DSO (64 kbps) channels over switched or leased-line Time Division Multiplexing (TDM) networks into a wideband channel (128 kbps–2 Mbps) to transport audio, video, data and control in a point-to-point manner. Multipoint conferencing is achieved through a centralised Multicast Control Unit (MCU) as shown in FIG. 1 which typically mixes audio and multicasts the single current speaker to all sites. An alternative, a distributed switching and mixing arrangement will be described with reference to FIG. 2.

More rapid growth of this market has been hampered by both high equipment costs and high service costs. In addition to the cost of video COder/DECoder (CODEC) hardware, equipment costs are exacerbated in current networks by the need for Inverse Multiplexers (I-MUXs) to aggregate switched DSO circuits due to the absence of wideband channel switching, and MCUs due to the absence of multicast switching. Service costs have been kept high due to bandwidth based tariffs needed to protect revenues from voice telephony and so high bandwidth, high quality video conferencing is still a luxury rarely afforded.

Further limitations exist at the users terminal. Real-time media imposes high processing requirements, particularly if the media stream needs to be decompressed for display. Usually the resolution and size of display monitors is restricted.

FIG. 1 shows in schematic form a known video conferencing arrangement. Using multicast control unit (MCU) for multiplexing or mixing and distributing all video streams transmitted by the network 2 to and from users 3 gives a centralised topology. This is suitable for use with a point to point network such as the telephone network. The expensive dedicated video mixing or selecting equipment need be provided in only one place while making use of the switching capability already provided in the network 2. One of the users 3, a chairman, has facilities to control the MCU, 1.

In operation, each user sends its own video and audio to the MCU. The chairman controls the MCU to select one of the incoming video streams, or add the video streams together in separate windows of the single output video streams. The input audio streams would all be mixed together, or the audio streams with most activity could be selected for mixing and outputting. The MCU duplicates its output video and audio streams and sends them to each of the users. Such arrangements may be limited in bandwidth or number of users by the capabilities of the MCU, or by the bandwidth of the telephone network connections.

In another known conferencing arrangement illustrated in FIG. 2, a LAN network 4 with multicast capability connects users 3. This obviates the need for a dedicated MCU. Users 3 can control which other users they see.

FIG. 3 illustrates the information which may pass between a user 10 and a network 11 such as a packet network, connecting other users 3 for video conferencing. Awareness information of which of a users are connected to the network is passed from the network to the user 10. In response to this information, a user can choose manually which other users he wants to see. Video selection request information is then passed from the user to the network. The network has the capability to take the request and switch appropriate video streams from other users 3 to the user 10.

Network restrictions have often precluded sending streams from all users in a video conference to all other users. Accordingly, the centralised switching approach shown in FIG. 1 involves either selecting one of the streams from users 1, 2, 3, for display, or creating a single image stream comprising a composite display of two or more reduced size images or windows.

U.S. Pat. No. 4,531,024 (Colton) describes a way of resolving how to select a single video stream to be transmitted to all other conference locations. The selection is made automatically by centralised detection of either one and only one "talker" or one and only one video graphics transmission request. Manual override is possible at each location, to select manually the video to be viewed.

U.S. Pat. No. 5,003,532 (Ashida) shows a video conference system having a centralised image selector operating according to requests from users or according to speaker detection.

U.S. Pat. No. 5,382,972 (Karres) describes a conferencing system which creates a composite signal with voice sensitive switching means for moving the component streams to different regions on the screen, and different sizes of picture, according to who is talking. A master user has an override control.

A further development is shown in U.S. Pat. No. 5,473,367, in which any conferee can assume the chairing role, and manipulate manually the picture which will be viewed by all. Additionally, each conferee can choose their own picture content, or take the chair view.

U.S. Pat. No. 5,615,338 shows a system in which a central controller controls the transmission from each user terminal directly, and selects two users to transmit to all other users according to user requests and a predetermined priority scheme.

U.S. Pat. No. 5,392,223 shows a communications processor for linking a group of workstations, to a network for video conferencing. A workstation initiates a request for service including type of service and destination. Bandwidth, resolution and transmission rate are adjustable. Artificial intelligence software is used in the processor, which reacts to the instantaneous loadings, and indicates to the user what is possible if the request for service can't be fulfilled.

Another example of a decentralised videoconferencing network is shown in U.S. Pat. No. 5,374,952, using a broadband LAN. Television signals from each user are transmitted simultaneously at different frequencies. Each user's computer monitors the status of channel allocations and generates the channel selecting control signals. Such dedicated LANs have inherent broadcasting capability which implies the ability to multicast, i.e. send to a select group of users.

None of the above systems is scaleable to handle large conferences because of human cognitive limitations in viewing a screen with too many windows displayed simultaneously, or with manually selecting between too many available windows. Additionally, the users terminal may have limited processing power and limited display area, and the network resources may limit how many streams can be sent to him anyway.

SUMMARY OF THE INVENTION

It is an object of the invention to provide improved method and apparatus.

According to the invention, there is provided a method of selecting for display one or more streams from a number of real-time media streams available to be transmitted across a communications network for display on respective terminals of a first, and at least one other user, the method comprising the steps of: determining a policy of the first user for making the selection, the policy comprising an indication of how the selection should be made, the policy being selectable by the first user; determining a condition of at least one of the communications network and the terminal; determining dynamically which streams to select for the first user according to the condition and according to the first user's policy; and, causing only the selected streams to be passed for display on the terminal of the first user, independently of selections made for passing to the other users.

Dynamic selection from multiple streams enables the user to concentrate on the content not the form of presentation. Individual control of display policy, independent of what other users see, enables tailoring to suit resources and user needs. Taking into account the condition enables better utilisation of limited resources. Together they enable larger conferences to be handled more easily.

Preferably, it is determined if the selection is restricted by the condition, the policy comprising an indication of how to make the selection when the selection is restricted by the condition. This enables optimal presentation of larger numbers of streams by better exploiting limited resources, or enables participation of users with diverse levels of local or network resources.

Advantageously, the indication comprises relative priorities between desired streams. This enables the user to be presented with the more important streams where a choice needs to be made, and leaves user free to concentrate on content rather than continually making choices.

Preferably, the condition comprises a level of availability of network resources. This enables more optimal selection particularly for networks where congestion is likely and is variable. It also enables cost limiting for bandwidth tariffed networks, to ensure optimal use of available network resources.

Advantageously, the condition comprises a level of availability of user terminal resources. This enables better sharing of resources, particularly where different users have terminals with differing limitations. The integrity of a maximum number of media streams can be preserved.

Advantageously, activity on one or more of the media streams is determined, the indication comprising an indication of how to make the selection dependent on the activity. This enables the selection to include the streams most likely to be of interest and to drop streams of less interest.

Preferably, where two or more of the media streams originate from a single source, the indication of how to make the selection dependent on the activity comprises making the selection of one of the co-originating streams dependent on activity on another of the co-originating streams. This enables the user to be presented automatically with streams which are likely to be of interest because they are associated with a stream showing activity.

Advantageously, the step of determining the selected streams is carried out at the first user's terminal. This enables the method to be used with less specialised equipment in the network.

Preferably, the method further comprises the step of indicating to the network which are the selected streams, wherein the step of passing the selected streams comprises transmitting across the network only the selected streams. This enables reduced bandwidth requirements in the network and at the user network interface.

Advantageously, the media streams comprise video streams. As video has high bandwidth, it is more important to utilise and share resources more efficiently, bearing in mind human perception and resource limitations.

Preferably, the network is a multicast capable network. If the network is multicast capable, less specialised equipment is necessary in the network and at the users terminal.

Advantageously, the first user also transmits at least one real-time media stream to take part in a conference between multiple users across the communications network. The dynamic nature of conference type communication makes for heavier burdens on network and computing resources and on human cognitive abilities, and so better management of the selection is more advantageous.

According to another aspect of the invention, there is provided software, stored on computer readable media, for carrying out the method.

According to another aspect of the invention, there is provided a method of selecting for display one or more streams from a number of real-time media streams available to be transmitted across a communications network for display on respective terminals of a first, and at least one other user, the method comprising the steps of: determining a policy of each of the users for making their respective selection, the policy comprising an indication of how the selection should be made, the policy being selectable by the first user; determining a condition of at least one of the communications network and the terminal; determining dynamically which streams to select for each user according to the condition and according to the respective policy; and, causing only the selected streams to be passed for display on the terminal of each user, independently of selections made for passing to the other users.

According to another aspect of the invention, there is provided apparatus for selecting for display, one or more real-time media streams available to be transmitted across a communications network for display on terminals of a first user and other users, the apparatus comprising: means for determining a policy of the first user for making the selection, the policy comprising an indication of how the selection should be made, the policy being selectable by the first user; means for determining a condition of at least one of the communications network and the terminal; means for determining dynamically which streams to select for the first user according to the condition and according to the first user's policy; and, means for causing only the selected streams to be passed for display on the terminal of the first user, independently of selections made for passing to the other users.

According to another aspect of the invention, there is provided a network node for use in passing real-time media streams across a communications network for display on terminals of a first user and other users, the node comprising apparatus for selecting streams for display on the terminal of the first user, the apparatus comprising: means for determining a policy of the first user for making the selection, the policy comprising an indication of how the selection should be made, the policy being selectable by the first user; means for determining a condition of at least one of the communications network and the terminal; means for determining dynamically which streams to select for the first user according to the condition and according to the first user's policy; and, means for causing only the selected streams to be passed for display on the terminal of the first user, independently of selections made for passing to the other users.

According to another aspect of the invention, there is provided a terminal for displaying real-time media streams available to be transmitted across a communications network for display on the terminal and other terminals coupled to the network, the terminal comprising: means for coupling the terminal to the network to receive the streams from the network, means for determining a policy of a terminal user for making a selection from amongst the streams, the policy comprising an indication of how the selection should be made, the policy being selectable by the first user; means for determining a condition of at least one of the communications network and the terminal; means for determining dynamically which streams to select for the first user according to the condition and according to the first user's policy; means for causing only the selected streams to be passed for display on the terminal of the first user, independently of selections made for passing to the other users; and means for displaying the selected streams.

According to another aspect of the invention, there is provided a method of selecting for display one or more streams from a number of real-time media streams available to be transmitted across a multicast capable communications network for display on a users terminal, the method comprising the steps of: determining a policy of the user for making the selection, the policy comprising an indication of how the selection should be made, the policy being selectable by the user; determining dynamically at the users terminal which streams to select for the first user according to the user's policy; and, sending a request from the users terminal to the network to transmit only the selected streams for display on the users terminal.

Preferred features may be combined as would be apparent to a skilled person, and may be combined with any aspect of the invention.

To show, by way of example, how to put the invention into practice, embodiments will now be described with reference to the accompanying drawings.

BRIEF DESCRIPTION OF THE DRAWINGS

FIGS. 17a(i) and 17a(ii) show in schematic form the operation of the T_stream activity monitor of FIG. 6;

FIGS. 17c(i) and 17c(ii) show the operation of the workstation resource monitor of FIG. 6, in schematic form;

FIGS. 17d(ii) and 17d(iii) show a more detailed example in schematic form of the operation shown in FIG. 17d(i);

FIGS. 18b and 18c show operation of the transmission and reception processes of the conference awareness module of FIG. 18a;

DETAILED DESCRIPTION

An overall view will be described first, followed by more detailed descriptions of the functions of particular parts. Then some system considerations for implementing a conferencing system will be given, followed by a discussion of advantages and alternative embodiments.

Figure 1:
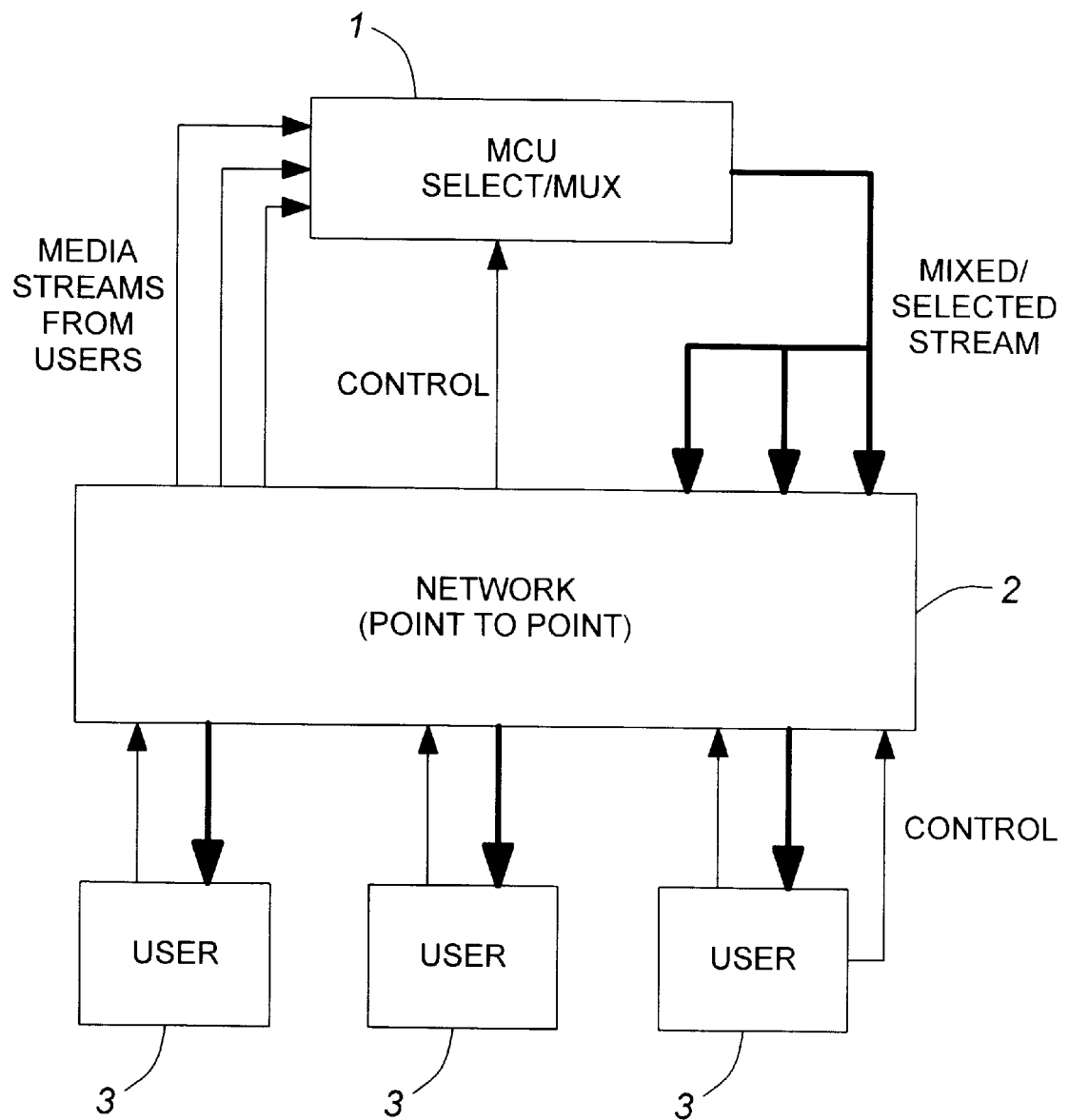
FIGS. 1 to 3 show in schematic form prior art video conferencing arrangements.
Figure 2:
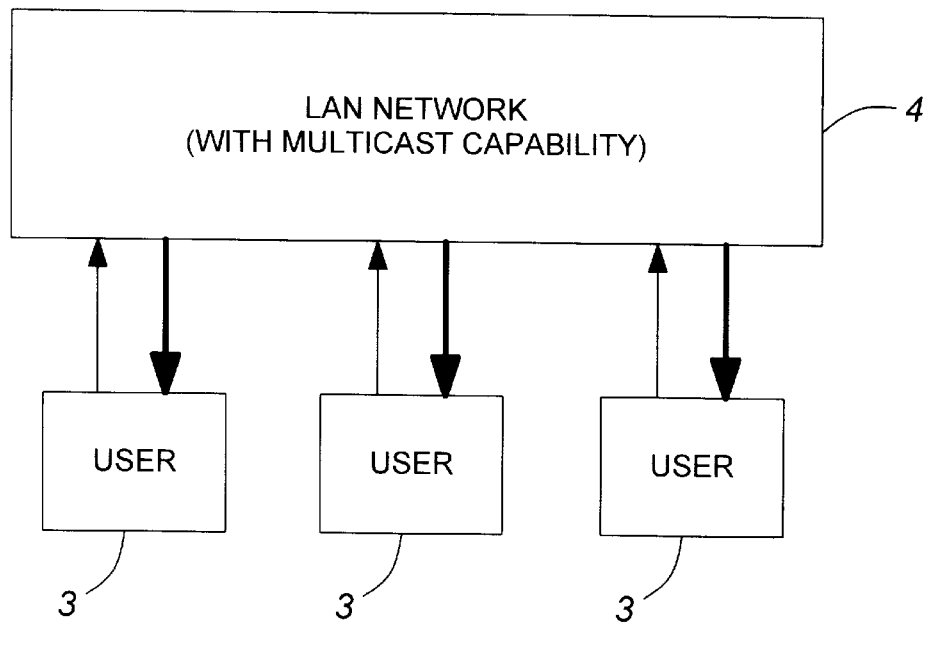
Figure 3:
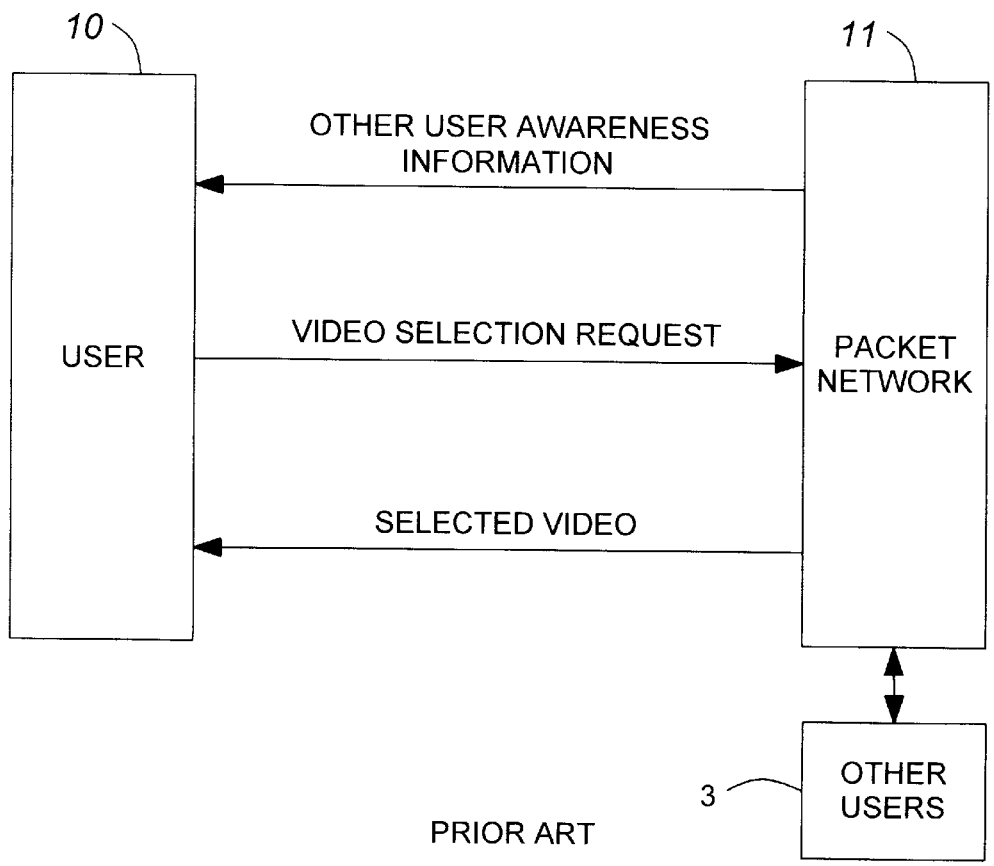
Figure 4:
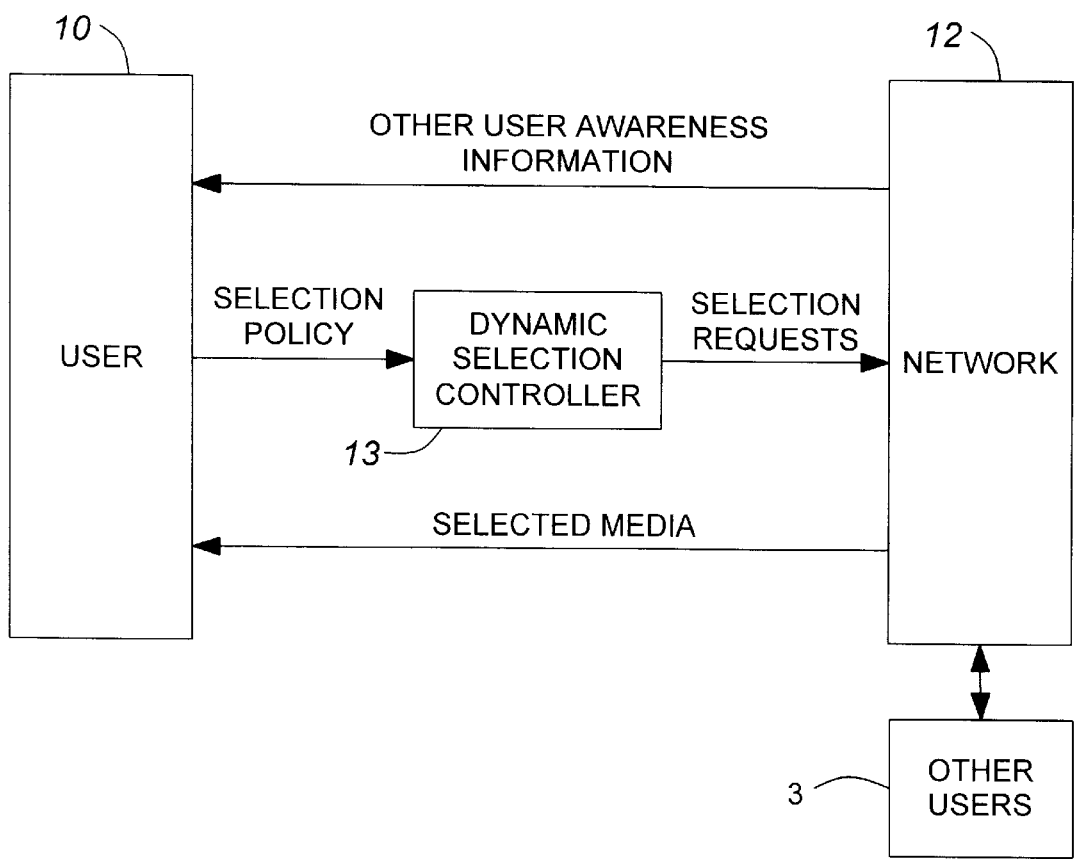
FIG. 4 shows in schematic form an embodiment of the invention.

FIG. 4 shows in schematic form how the information passed between the user 10 and the network 12 is altered by the provision of a dynamic selection controller 13. The user inputs a selection policy including criteria for making the selection. The dynamic selection controller determines the actual selection requests on the basis of the policy and the conditions. The network 12 then passes the selected media streams to the user on the basis of the request made by the dynamic selection controller 13. The selection policy can include desired requests. The dynamic selection controller may issue selection requests in a (best effort) basis, to try to meet the desired selection requests of the selection policy. The selection controller 13 can be located in the users terminal, or in the network.

The network 12 could be a point to point network, in which case one or many MCUs would be required to enable the distribution of the media streams to multiple users. Preferably the network is capable of multicasting. Where each media stream is considered to be a multicast group, to which users wishing to receive the stream can apply for membership of the group, the selection controller 13 dynamically manipulates the membership. This enables a scalable solution to large multi-party video conferences to be achieved. Limitations of human cognitive abilities in controlling and comprehending large numbers of video inputs, and resource limitations in transmitting large numbers of high bandwidth media streams, can be reduced. Thus the dynamic selection controller 13 can be seen as a receiver-based reactive congestion control mechanism.

The network 12 could comprise a local area network alone, or a series of connected local and wide area networksnetworks. For example, a corporate intranet or the internet, or the public telephone network could be used for global coverage.

In operation, a user may select his or her desired view of a conference by selecting a set of conferees he or she desires to view, or by selecting a dynamic viewing policy, e.g. including prioritizing media streams, or a mixture of these. The dynamic selection controller 13 makes a best effort attempt based on users desires,and resource conditions such as losses detected in received media streams, direct feedback from the network and local computing resources. The policy make take into account, media stream activity periods, and the changing conference environment, and may express how to respond to detected resource limitations. The first step of determining the policy may include retrieving a stored indication of the policy, or prompting the user for policy inputs, or calculating the policy from previous preferences, for example.

More details of the structure of an embodiment of a users terminal will now be given with reference to FIGS. 5A and 5B.

Figure 5A:
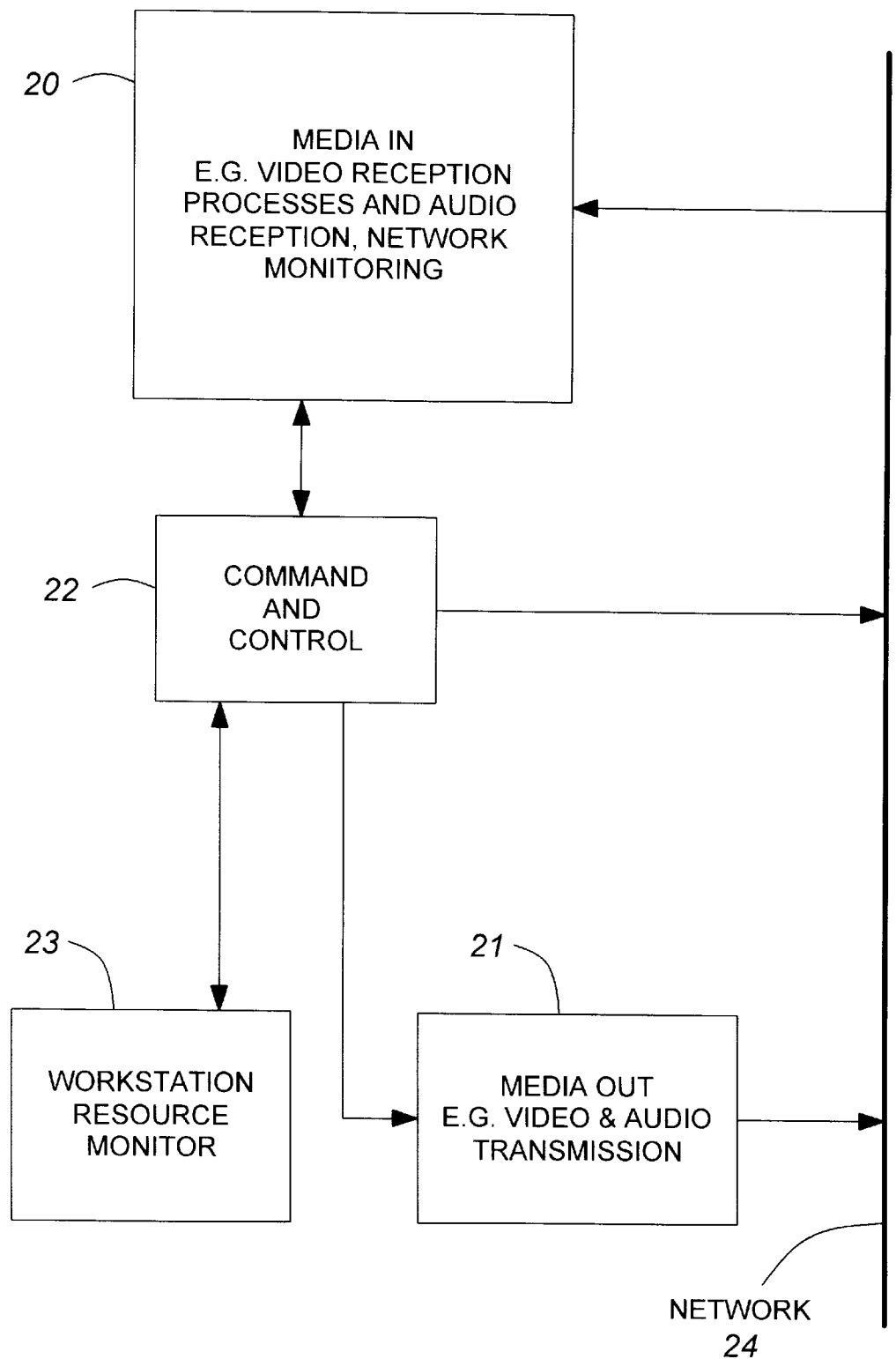
FIG. 5a shows an architecture overview of a conferencing terminal for use in the arrangement of FIG. 4.

FIG. 5A illustrates in schematic form a conferencing terminal architecture overview. A media in portion, 20 includes for example means for carrying out video reception processes, audio reception processes, and network monitoring. A media out portion 21 includes means for carrying out video and audio transmission to the network 24. The media out portion may be dispensed with to give a terminal suitable only for receiving, e.g. for monitoring or entertainment purposes. A command and control portion 22 communicates with the media in portion and the media out portion. There may be some direct connection between the command and control portion 22 and the network 24, e.g. for sending and receiving conference awareness messages relating to each of the users of the conference.

A workstation resource monitor 23 can be provided for feeding information to the command and control portion 22.

Figure 5B:
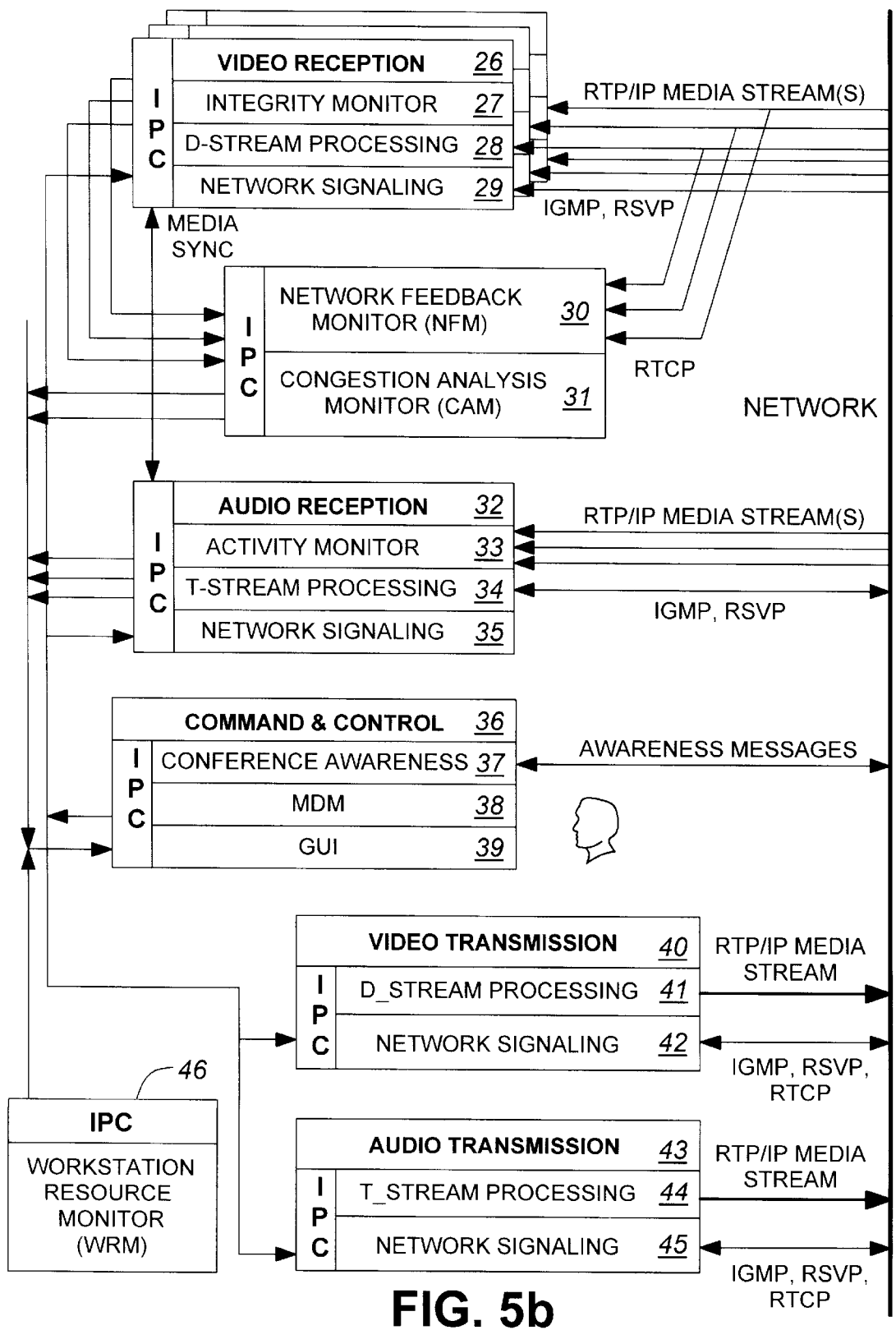
FIG. 5b shows the architecture of FIG. 5a in more detail.

FIG. 5B shows more details of the conferencing terminal architecture shown in FIG. 5A. Each of the parts will be described in terms of processes which can be run simultaneously on the users terminal, either by multi-tasking a single central processor, or distributed across multiple processors in the terminal. The hardware configuration is a matter of design choice.

As part of the media in section 20, multiple video reception processors 26 are provided, one for each incoming video stream. Each video reception process 26 includes a display stream (D_stream) integrity monitor 27 for monitoring the integrity of the display stream, e.g. the number or rate of packets or frames which are lost or delayed. Each video reception process also includes a D_stream processing module 28 for decoding the incoming media stream. This may involve building up video frames from the stream of packets, and performing any decompression as required.

Each video reception process 26 also includes a network signalling module 29 for carrying out network signalling functions.

An interprocess communication (IPC) function is provided for communicating between processors, e.g. by message passing, or using shared memory.

A network feedback monitor 30 is provided, for monitoring messages received from the network. A congestion analysis monitor 31 is provided for determining network congestion.

A single audio reception process 32 is provided even where there are multiple input audio streams. This is convenient because normally only a single audio output is provided to the user, mixed from all the input audio streams, or the most active of the input audio streams. The audio and reception process 32 includes a trigger stream (T-stream) activity monitor 33, a T_stream processing module 34, and a network signalling module 35. The audio is designated the trigger stream since it is often used for triggering display of the video stream corresponding to the loudest audio input stream.

A command and control process 36 includes a conference awareness module 37, a membership decision module MDM 38, and a graphical user interface, GUI 39. The MDM is at the heart of the dynamic selection control function, and will be described in more detail below.

A video transmission process 40 is provided for the outgoing video to other users of the conference. It comprises a D_stream processing module 41 and a network signaling module 42. An audio transmission process 43 includes a T_stream processing module 44 and a network signaling module 45, for handling the outgoing audio stream from the terminal to the other users. The video transmission and audio transmission processes would not be needed if the terminal were to be used only as a receiver.

A work station resource monitor 46 is provided for monitoring the local resources such as processing power, memory, and display capability.

Figure 6:
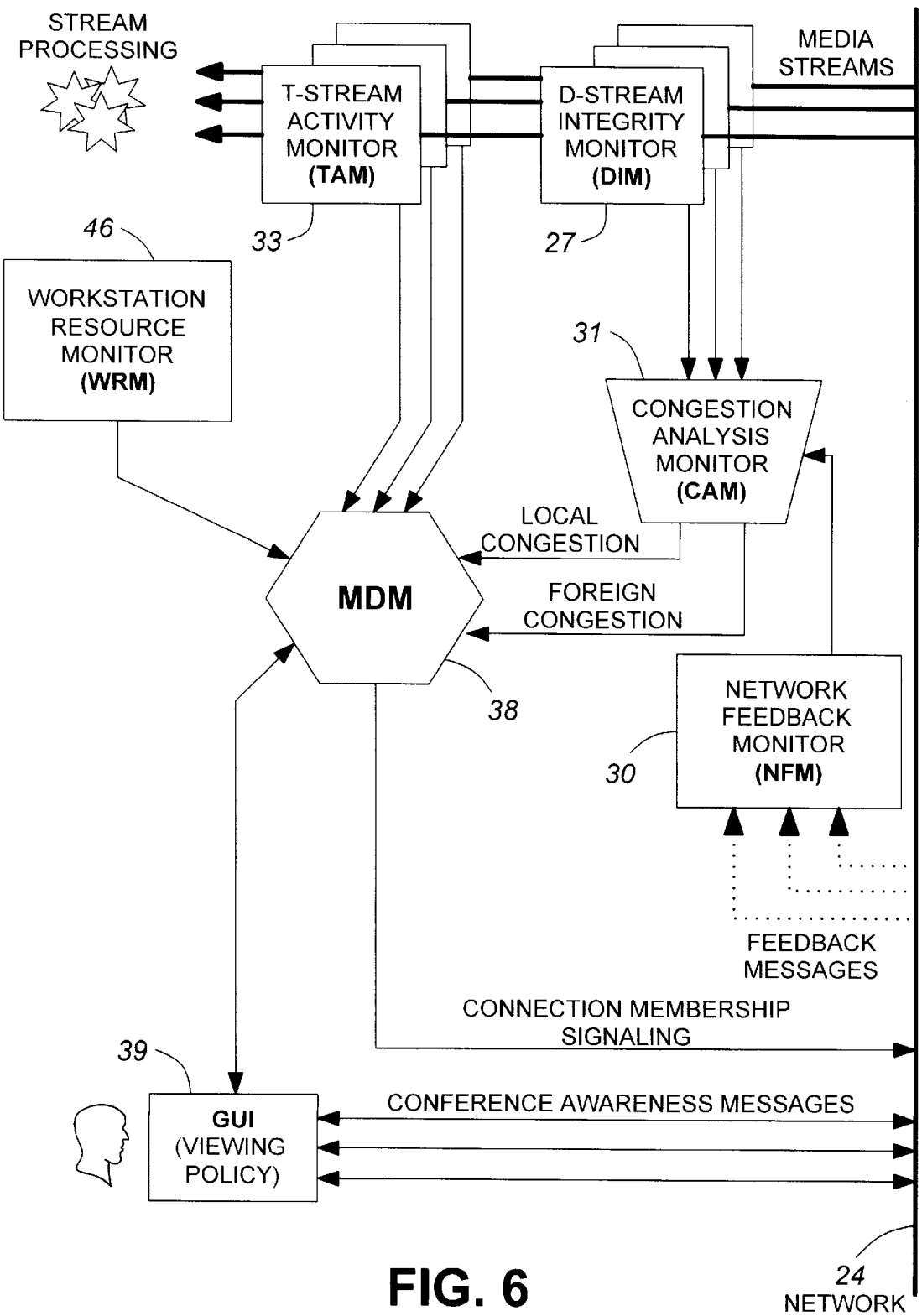
FIG. 6 shows the architecture of the elements of FIG. 5b which are concerned with the membership decision module.

The operation of the MDM 38, and the processors which are linked with it will now be described with reference to FIG. 6. The MDM 38 receives inputs from the T_stream activity monitor (TAM) 33, the workstation resource monitor (WRM) 46, and from the congestion analysis monitor (CAM) 31. It also receives inputs from the graphical user interface (GUI) 39, and outputs selection requests in the form of connection membership signals to the network. In this way, the MDM can make connection membership requests based on the user's viewing policy and the current conditions, on a best effort basis. The MDM could be arranged to receive inputs from a subset of the inputs according to need. For example, if the workstation resource is always likely to be more limiting than the network resources, the MDM could operate upon inputs from only the GUI and the WRM, without needing local or foreign congestion inputs. Where network congestion may be a problem, it is useful to divide it into local or foreign congestion to enable the MDM to take appropriate action. For example, where there is local congestion, it may be appropriate to request fewer media streams to be transmitted. Where the congestion is foreign, it is more likely to affect only some of the input streams. Thus it may be appropriate not to reduce the number of media streams requested, but simply choose media streams which are not affected by the foreign congestion.

The operation of the MDM 38 will be explained below in terms of five threads of operation, run in parallel. These threads are explained with reference to FIGS. 7 to 16. The operation of each of the monitors shown in FIG. 6 will be explained with reference to FIGS. 17a to 17e. Other elements of the terminal will be described thereafter.

The five threads of the MDM cover the response to GUI events, a periodic consistency check to see if additional streams can be displayed, and responses to new T_stream activity or silence, and the response to a closing of a D-stream by its originator.

Figure 7:
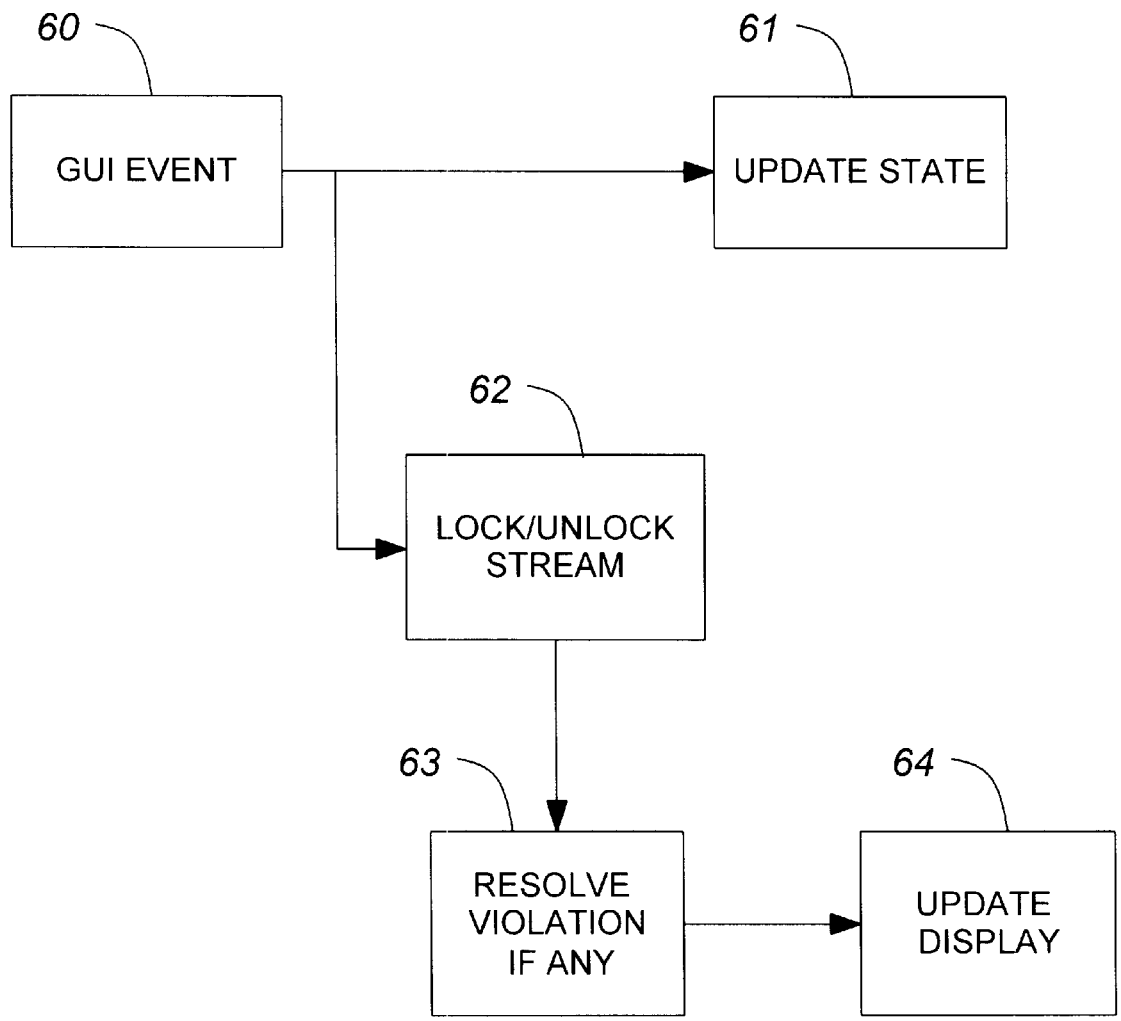
FIG. 7 shows in schematic form a GUI event response thread of the MDM.

MDM Thread 1, GUI Events Response, FIG. 7

FIG. 7 illustrates in schematic form an overview of this thread. On detection of a GUI event, 60, passed to the MDM by the interprocess communication (IPC), the event is determined to relate to a state change, or to locking or unlocking of a stream. In the former case, the state is updated at 61, while in the latter case, the stream is locked or unlocked at 62 and violation of any predetermined constraints is resolved at 63, before the display is updated at 64. Locking a stream means giving it the highest priority, to ensure it is displayed all of the time, regardless of activity on the corresponding audio stream. Obviously, if too many streams are locked, a constraint may be violated, such as a workstation resource constraint, or local or foreign network constraints.

Figure 8:
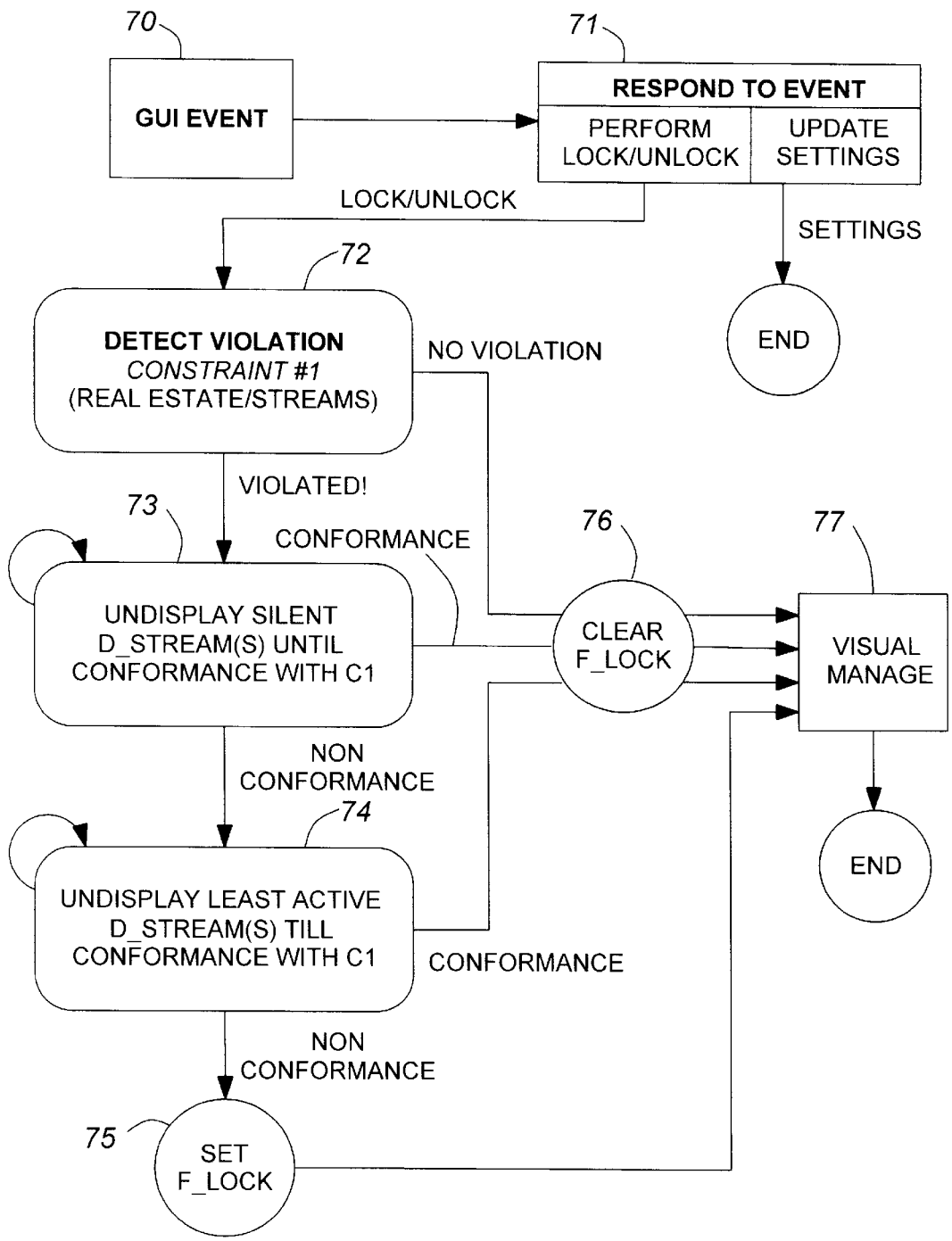
FIG. 8 shows the thread of FIG. 7 in more detail.

FIG. 8 shows an example of how the thread could be implemented, in more detail. In response to the GUI event 70, locking or unlocking, or setting updating is determined at 71. At 72, violation of constraint 1 is detected. This is concerned with the number of streams which can be displayed simultaneously by the user's terminal. It would be a predetermined number, but could be varied according to user-defined window sizes for example. If the constraint is not violated, a locking flag, F_lock is cleared at 76, and the display is updated by a visual management process 77. If a violation of constraint 1 is detected, at 73, the thread tries to remove display streams corresponding to silent audio channel, until conformance with the constraint is achieved. Then the locking flag is cleared at 76 and the display updated at 77.

If there are insufficient silent streams, at 74, the thread tries to remove the display streams corresponding to the least active audio stream, until conformance with constraint 1 is achieved. If conformance is achieved, the lock flag is cleared at 76, otherwise the flag is set at 75, and the display updated.

Violations of other constraints are more conveniently dealt with by other threads, to enable asynchronous or synchronous response as desired. This can assist in maintaining an optimum trade-off between rapid response to changes in conditions, and yet avoid disturbing oscillatory responses.

The determination of which streams are silent or less active, will be made by the T-stream activity monitor 33 shown in FIGS. 5b and 6, explained in more detail below. The types of settings which can be altered in response to a GUI event, will be explained in more detail with reference to the detailed description of the GUI.

Figure 9:
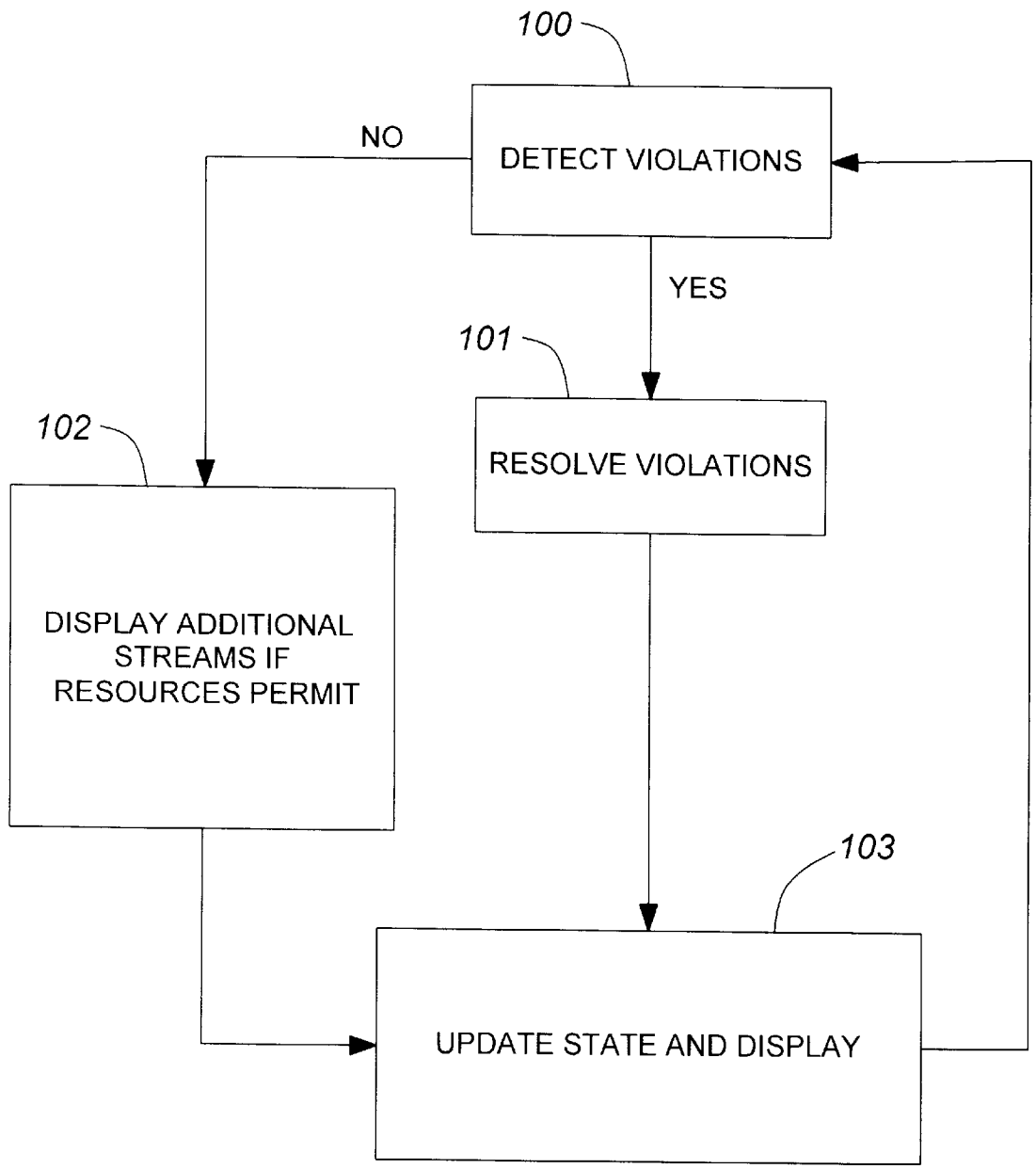
FIG. 9 shows in schematic form the consistency check thread of the MDM.

MDM Thread 2 Consistency Check, FIG. 9

FIG. 9 shows an overview of this thread in schematic form. Violations of a series of constraints are detected at 100, and resolved at 101 before the displayed streams are updated at 103. If no violations are detected, an attempt is made at step 102 to display additional streams if resources permit.

Figure 10:
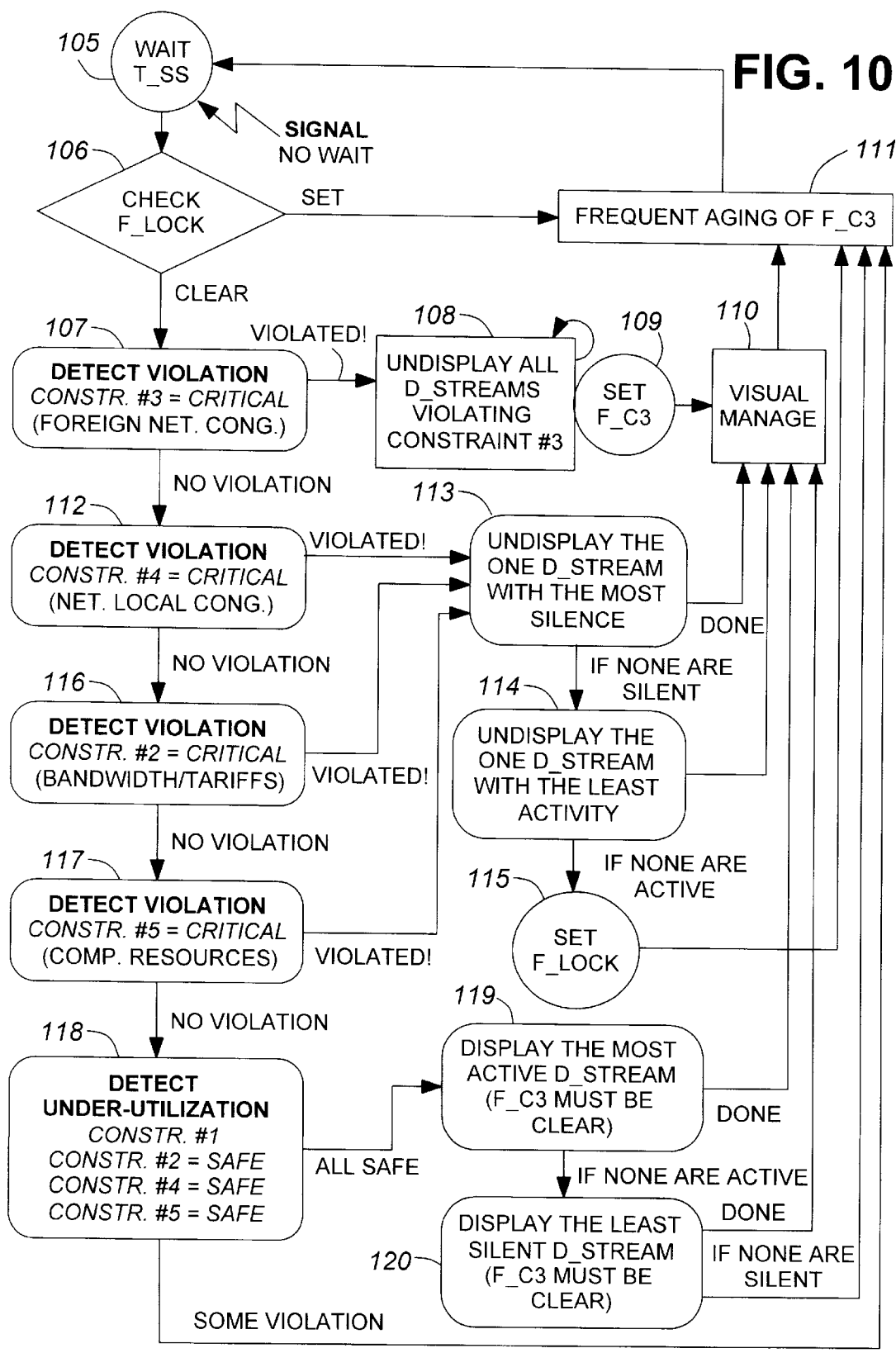
FIG. 10 shows the consistency check thread in more detail.

An example of how the thread might be implemented is shown in more detail in FIG. 10. This thread is repeated periodically, and the period can be determined according to the speed of response required. It may be appropriate to repeat it every 2 to 10 seconds or so.

After the waiting period at 105, the lock flag is checked at 106. If it is clear, the first constraint to be checked is constraint 3, relating to foreign network congestion. If critical, as determined by the congestion analysis monitor (CAM) 31, at 108, all display streams violating this constraint are removed from the display, and a flag is set indicating foreign network congestion, at 109. After the display is updated at 110, an aging counter for the foreign network congestion flag is updated at 111, so that the flag will clear itself after a period of time, to enable the affected streams to be requested again in case the foreign network congestion was only a temporary condition. The other constraints are not checked until the foreign network congestion constraint is met.

At 112, if the foreign network congestion constraint is met, then the next step is to detect violation of constraint 4, indicating critical local network congestion. An attempt is made to remove from display the D_stream with most silence in its corresponding audio stream among those showing congestion (step 113). If constraint 2 relating to bandwidth and tariff constraints in the network, or constraint 5 relating to computing resources locally, are violated, then at step 113, an attempt is made to remove from display the D_stream with most silence in its corresponding audio stream. If no silent T_streams are found at step 113, then at 114 the stream with the least activity is removed from the display. If no T_streams with activity are found, then it is assumed that too many display streams are locked, to give unconditional display, and at 115, the lock flag is set to reflect this. The thread is cycled again after the foreign congestion flag is aged at 111.

If none of the above-mentioned constraints are violated, then at 118, under utilisation of resources is detected by assessing whether all constraints are in a safe condition, meaning they are not close to a critical condition. In this case, at 119, the most active of the display streams not yet displayed is selected at 119. If there are no active T_streams, then a search is made for a T_stream in the silent state, and the least silent is displayed. Otherwise the thread is repeated.

MDM Thread 3, New T Stream Activity Response

Figure 11:
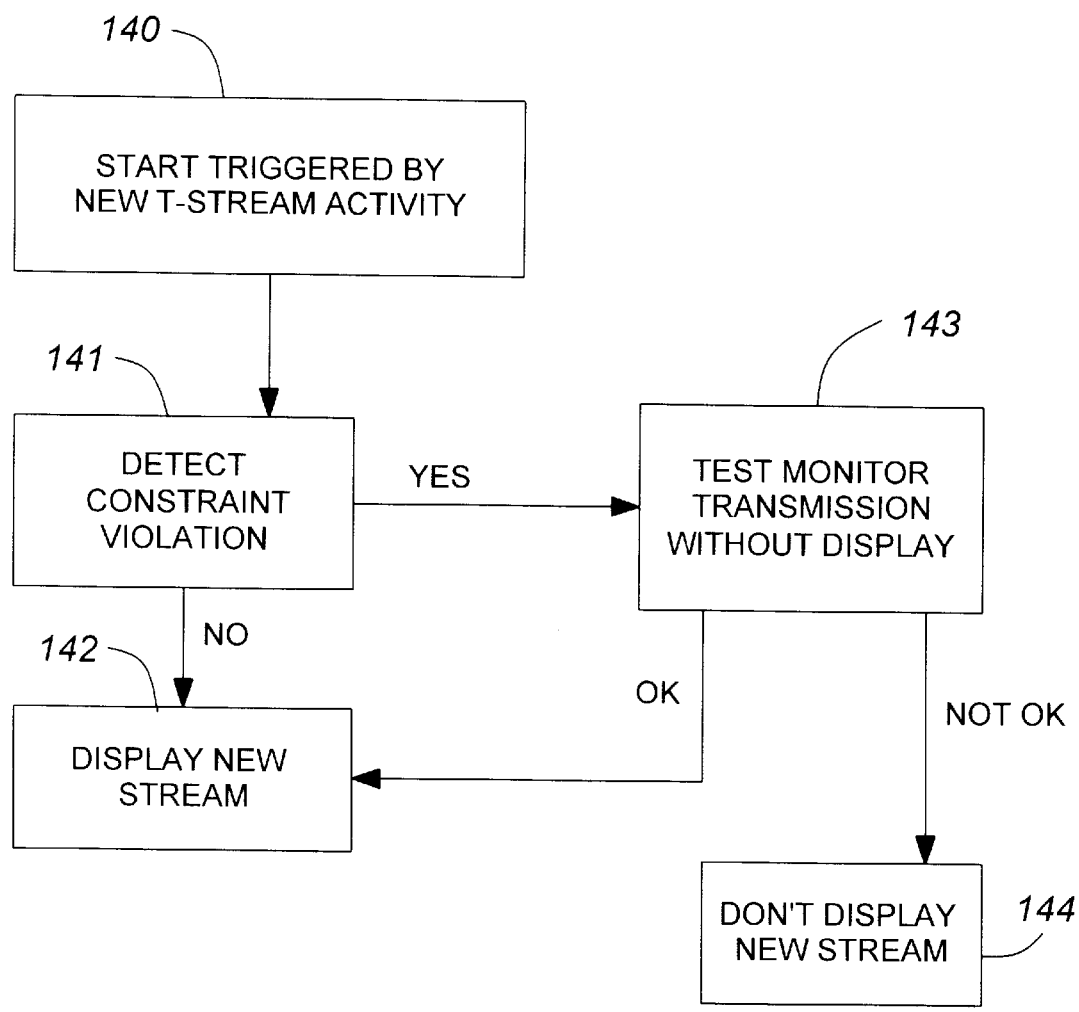
FIG. 11 shows the new T_stream activity response thread.

FIG. 11 shows an overview. The thread is triggered by new T_stream activity 140 passed to the MDM by the T_stream activity monitor 33, using the IPC. If there is a constraint violation detected at 141, a test transmission is made without display, to determine if the available resources allow for another stream, at 143. If the test is successful, the new stream is displayed at 142, otherwise it is rejected at 144.

Figure 12:
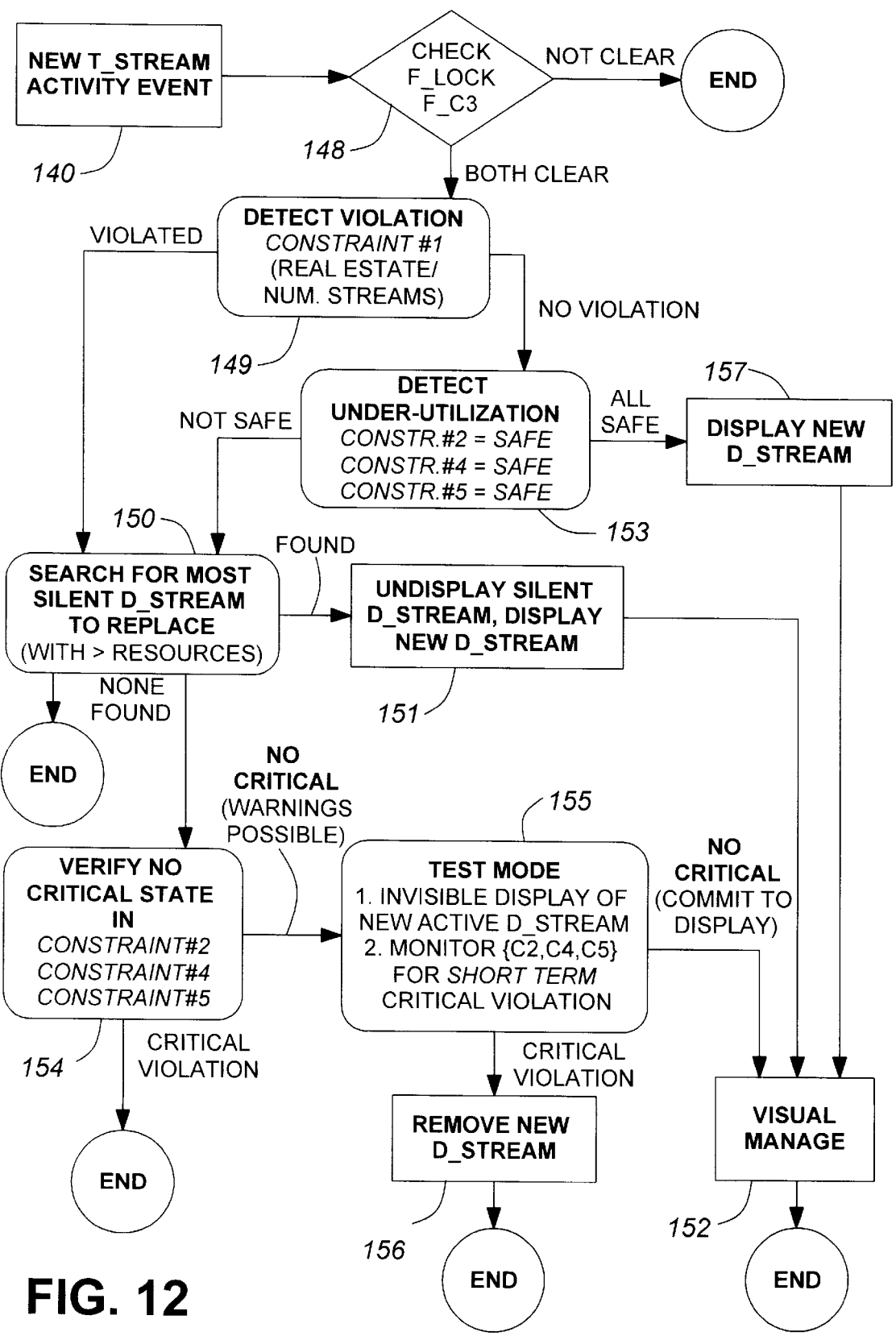
FIG. 12 shows the thread of FIG. 11 in more detail.

FIG. 12 shows an example of how the thread might be implemented. Following the event at 140, a check is made at 148 to see if the locked flag or the file congestion flag is set. If so, the thread is ended. Otherwise at 149, constraint 1, relating to the display capabilities, is tested. If the constraint is violated, at 150 a search is made for the most silent D_stream to be replaced. If one is found, the new display stream replaces the silent one at 151, and the management of the display is completed at 152. Otherwise, if no silent stream is found, the thread is ended.

If no violation of constraint 1 was found, at 153, under utilization of resources is detected by determining that constraints 2, 4 and 5 are in a safe condition. This enables the new display stream to be displayed straight away at 157. If one or more of the constraints are not safe, the search is made for a silent D_stream to be dropped, at 150 if none is found, the thread verifies there are no critical states in constraints 2, 4 or 5 at 154, then enters a test mode. This involves an invisible display of the new active D_stream to monitor for short term critical violations, at 155, before committing the stream to be displayed or removing it at 156 if critical violations are found.

MDM Thread 4, New T Streams Silence

Figure 13:
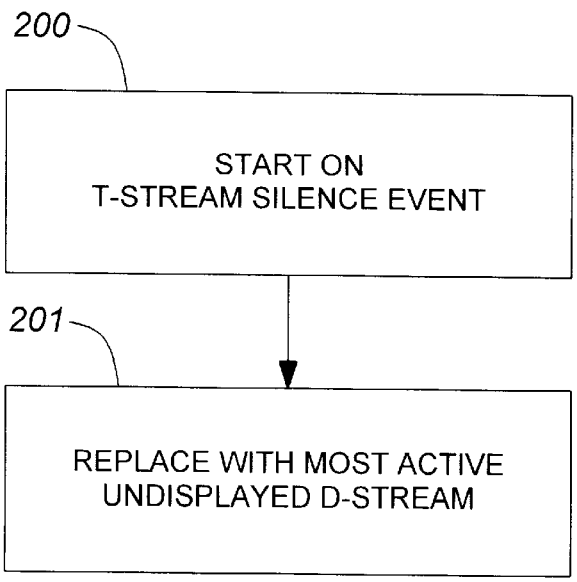
FIGS. 13 and 14 show the new T_stream silence thread in schematic form.

FIG. 13 shows an overview of this thread. When a new silence event occurs at 200, the most active undisplayed D_stream is used to replace a silent one at 201.

Figure 14:
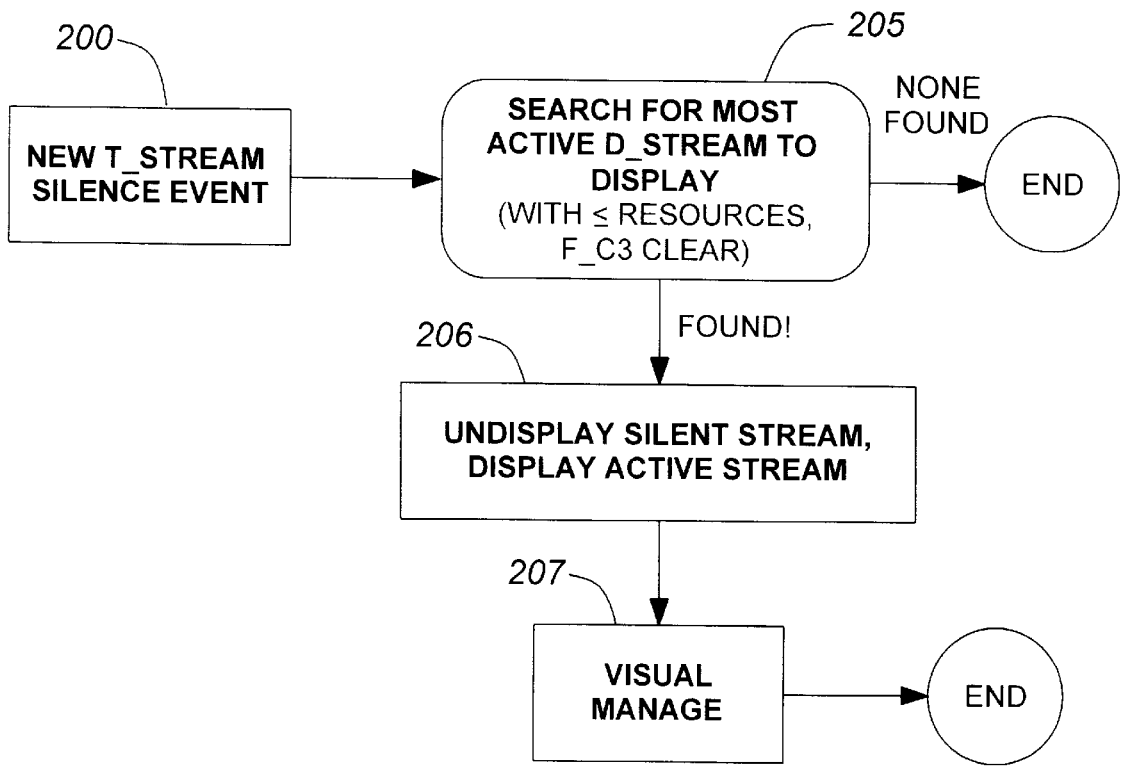

FIG. 14 shows an example with more details of how this thread might be implemented. Following the event at 200, the thread searches for the most active display stream, providing there are sufficient resources, and providing the foreign congestion flag is clear. If none are found, the thread ends. If any are found, at 206, the silent stream is removed, and the active stream is selected for display, at 206. The visual management process occurs at 207.

MDM Thread 5, D Stream Close

Figure 15:
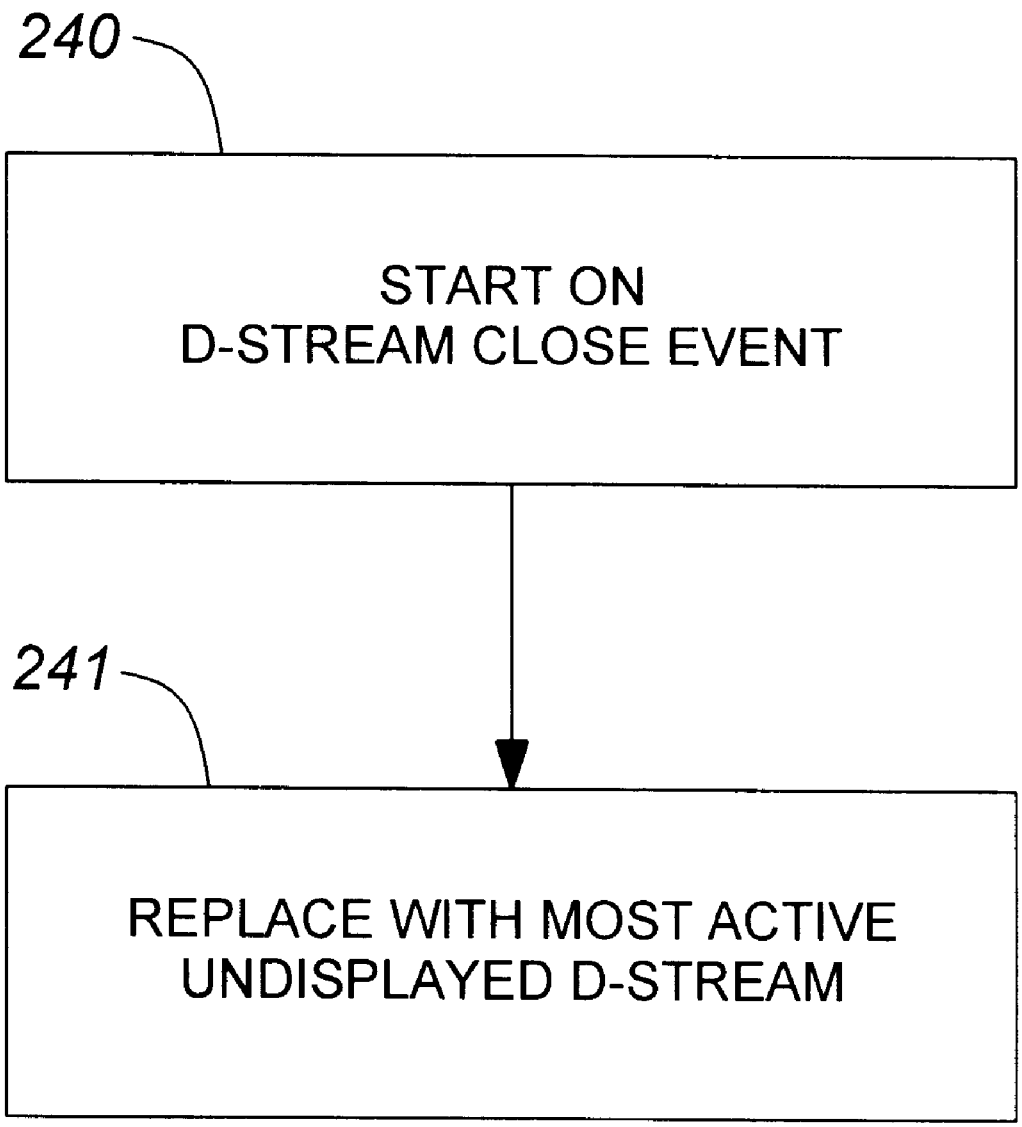
FIGS. 15 and 16 show the D_stream close thread in schematic form.

FIG. 15 shows an overview of this thread. At 240, the thread starts on a D_stream close event 240, notified to the MDM by the confidence awareness module 37 or by the D_stream processing module 28 and the network signalling module 29. At 241 the closed D_stream is replaced with the most active undisplayed D_stream.

Figure 16:
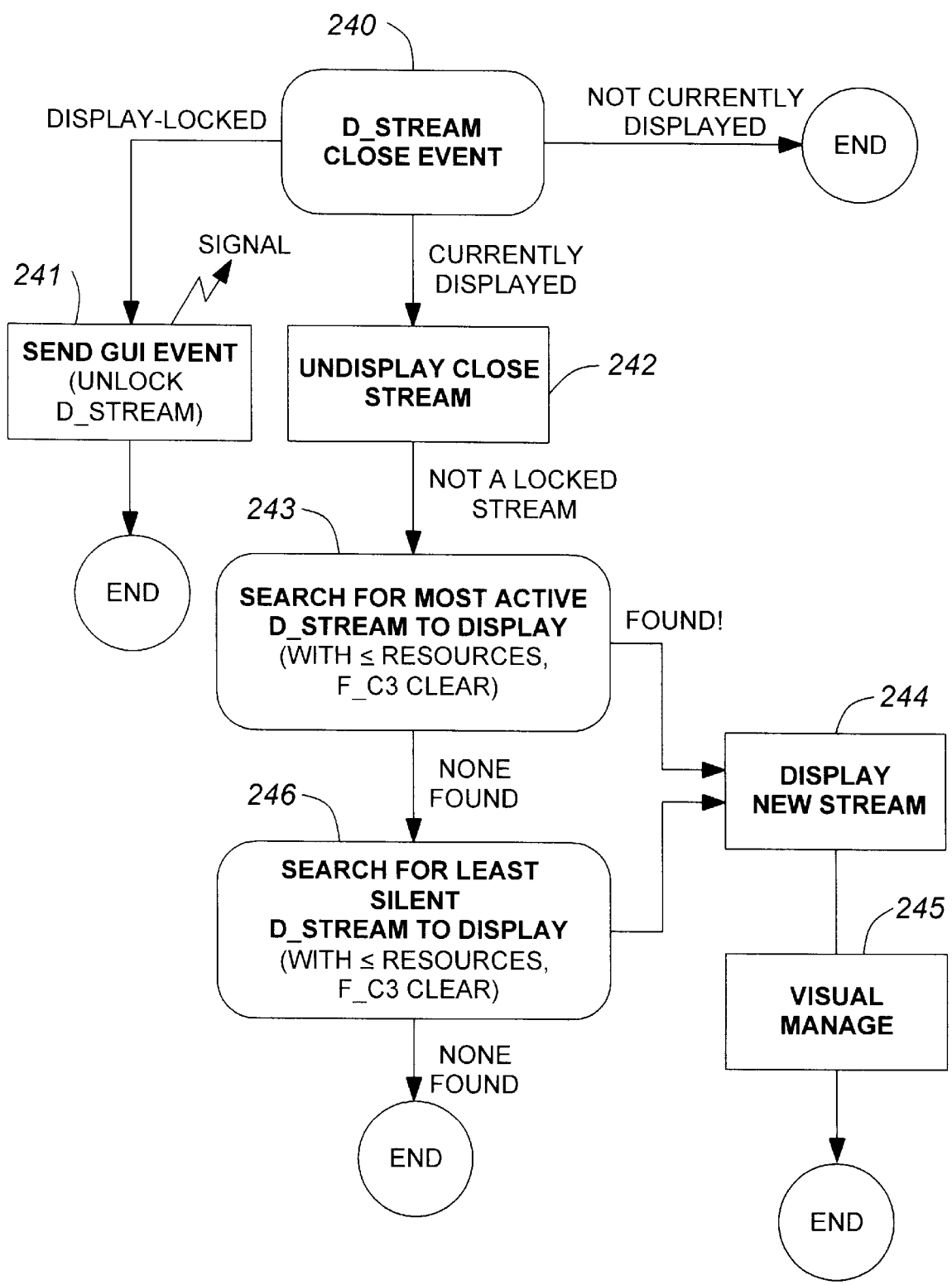

An example of how the thread might be implemented is shown in more detail in FIG. 16. On detecting the D_stream close events 240, the thread ends if that D_stream is not currently displayed. If it is locked and displayed, then at 241, the thread sends a communication to the GUI indicating that it should be unlocked. If the relevant D_stream is currently displayed and is not locked, the closed stream is removed from the display at 240. At 243, a search is made for the most active D_stream to display, provided there are sufficient resources, and provided its foreign congestion flag is clear. In this case at 244, the new stream is displayed, and at 245, the visual management uptake process is carried out. If no active stream is found for display, a search is made for any streams in a silent state, at 246. The least silent is selected if there are sufficient resources and if there its foreign congestion flag is clear. It is displayed at 244, otherwise the thread ends.

The Operation of the Monitors.

Feeding information to the threads described above, are the various monitors shown in FIG. 6. These include the T-stream activity monitor (TAM), the D_stream integrity monitor (DIM), the work station resource monitor, (WRM), the congestion analysis monitor (CAM), and the network feedback monitor (NFM). For each of these, a description will follow including details of counters, states, variables and thresholds where appropriate.

T Stream Activity Monitor (TAM) FIG. 17a

Description

The TAM provides an indication as the state of the T_Stream (either silent or active) as well as a degree of silence or activity. This aids the MDM in arbitrating between two or more candidate streams (for DISPLAY or UNDISPLAY). For every timeslice (which is of fixed duration), if activity exists on the T_Stream, the counter TAM_DEGREE is incremented, otherwise it is decremented if no activity exists. In order for an ACTIVITY event to occur, the TAM_HI_THR threshold must be overrun, similarly a SILENT event occurs when the TAM_LOW_THR is underrun. If an activity is detected, the appropriate event signal is dispatched and the state indicator TAM_STATE is updated.

Desirable Properties

It is desirable to have a relatively quick response to NEW activity. The system should not be overly sensitive however, which relies on properly setting of the various variables. The system should also not begin to oscillate and hence the purpose of the GRACE range.

Variables

TAM_MIN=Minimum Value of the counter (zero)

TAM_MAX=Maximum Value of the counter (implications on memory/silent period)

TAM_HI_THR=Threshold that delimits the lower bound of the activity range

TAM_LOW_THR=Threshold that delimits the upper bound of the silence range

TAM_STATE={0=Silent|1=Active}

TAM_DEGREE=RANGE [TAM_MIN, TAM_MAX]

TIMESLICE=Fixed unit of time, common to a media type.

FIG. 17a(i) illustrates the range of values which may be taken by the counter TAM_DEGREE, between minimum and maximum values. A counter may be incremented or decremented each time slice. The counterstate TAM_STATE can be either silent or active, according to the value of the counter. A grace interval is provided to give some hysteresis in the transition between silence and active states.

The operation of the monitor is shown in FIG. 17a(ii). At 250, instantaneous T_stream activity within the current time slice is detected, and the counter is incremented at 251. At 252 it is determined whether the counter crosses the transition from the grace region to the active region. If so, at 253, the new activity event is communicated to the MDM. If the increment does not cause a transition from the grace region to the activity region, indicated by crossing the TAM_HI_THR threshold in FIG. 17a(i), the thread ends. If no activity is detected, the counter is decremented at 254, and at 255 it is determined whether the decrement of the counter has caused it to cross threshold TAM_LOW_THR, shown in FIG. 17a(i). If so, at 256, a communication is sent to the MDM to indicate a new silence event.

It can be seen that the thresholds and the TIMESLICE period and the maximum and minimum counter values can be adjusted to achieve a suitably quick response to new activity without flooding the MDM with too many messages caused by inevitable brief silence periods during speech for example.

Figure 17B:
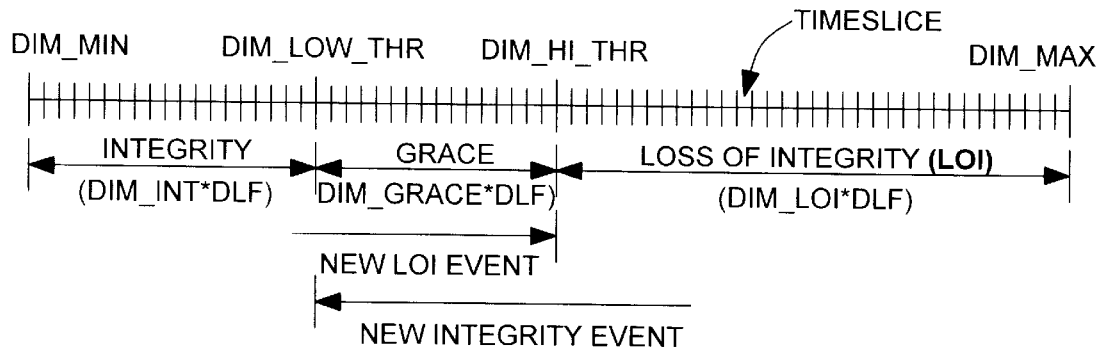
FIGS. 17b(i) and 17b(ii) show the operation of the D_stream integrity monitor of FIG. 6.
Figure 17B:
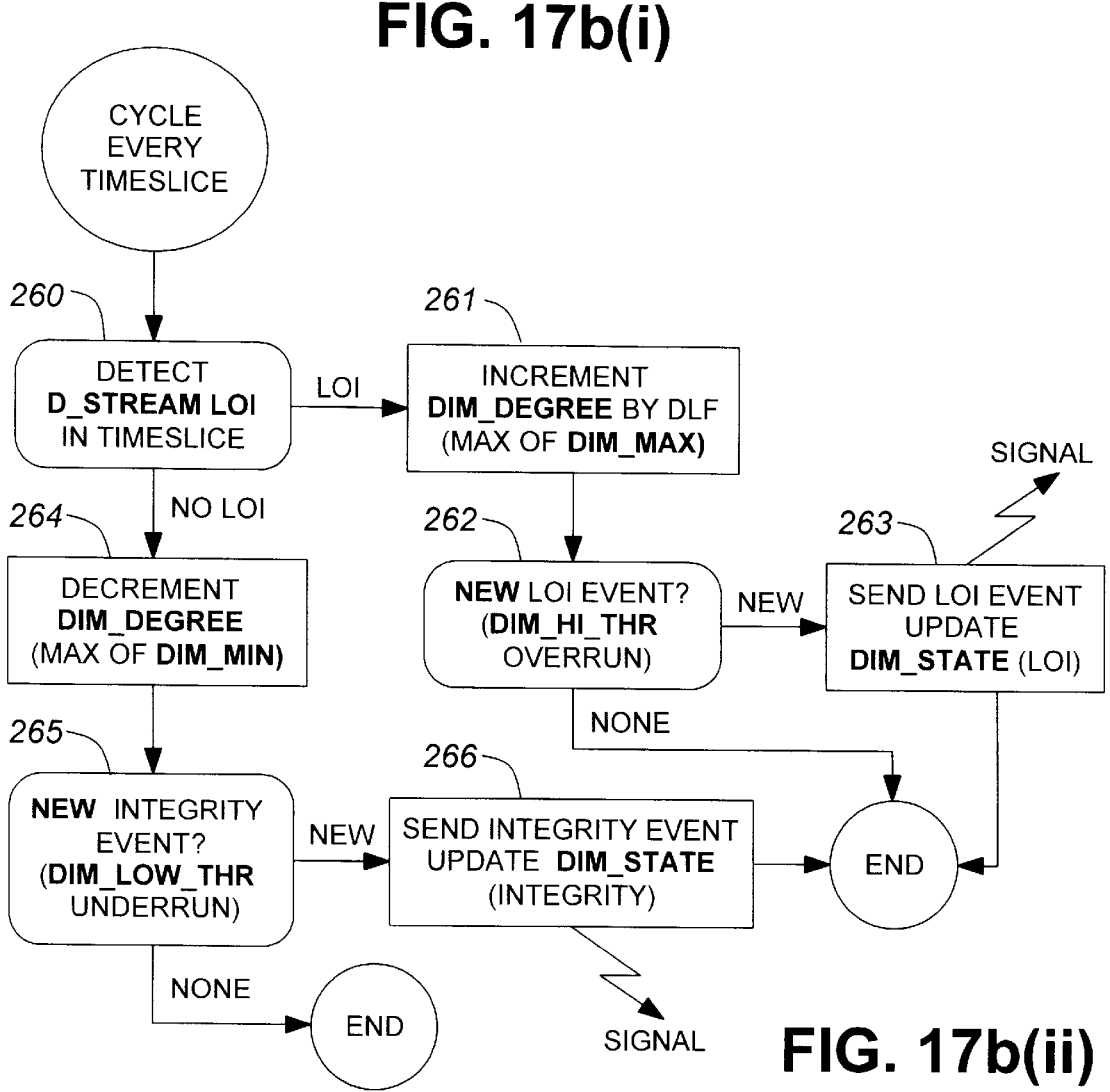

The D Stream Integrity Monitor (DIM) FIG. 17b

Description

The DIM provides a short-term indication as to the state of the D_Stream. Either data loss or missed deadlines constitute a Loss of Integrity (LOI) which is indicated by the DIM_STATE variable. The DIM_DEGREE counter is normalized to a percentage figure indicating the degree of integrity exhibited by the stream. The DIM aids the MDM by indicating the nature (either local or foreign) of LOI as well as the correlation that exists between various D_STREAMS experiencing LOI.

For every TIMESLICE (which is of fixed duration), a D_STREAM is monitored for an instantaneous LOI. If detected, DIM_DEGREE is incremented by DIM_LOSS_FACTOR (DLF). The DLF is specific not only to a media type, but also to a particular media stream. It represents the maximum loss rate allowed which would not significantly degrade the perceived media stream presentation. For example, assuming the D_STREAM represents a 20 fps video stream, where a timeslice is equivalent to one video frame duration (0.05 s), one could set the DLF to 10 to indicated that a one-in-ten frame loss rate is acceptable.

If no instantaneous LOI is detected within a timeslice, DIM_DEGREE is decremented. In order for a NEW LOI Event to occur, the DIM_HI_THR threshold must be overrun, similarly a NEW INTEGRITY Event occurs when the DIM_LOW_THR is underrun. If an event is detected, the appropriate event signal is dispatched and the state indicator DIM_STATE is updated.

Desirable Properties

It is desirable to have some tolerance to transient LOI, however any ongoing LOI should be detected an dealt with appropriately. The system should not be overly sensitive however, which relies on properly setting of the various variables. The system should also not begin to oscillate and hence the purpose of the GRACE range.

Variables

DIN_MIN=Minimum Value of the counter DIM_DEGREE (zero)

DIM_MAX=Maximum Value of the counter DIM_DEGREE (implications on memory/silent period)

DIM_HI_THR=Threshold that delimits the lower bound of the LOI range

DIM_LOW_THR=Threshold that delimits the upper bound of the INTEGRITY range

DIM_STATE={INTEGRITY|LOI}

DIM_DEGREE=RANGE [DIM_MIN, DIM_MAX] normalized to a percentage

TIMESLICE=Fixed unit of time, common to a media type

DIM_LOSS_FACTOR (DLF)=Media stream & type specific, loss tolerance figure

DIM_INT=Constant media type multiplying factor of DLF. Allows a margin of tolerance to initial loss.

DIM_GRACE=Constant media type multiplying factor of DLF.

Mitigates against oscillations.

DIM_LOI=Constant media type multiplying factor of DLF. Determines degree of "short-term" memory.

FIG. 17b(i) shows the range of the counter DIM_DEGREE, between minimum and maximum values. The counter can show a state of loss of integrity (LOI), or integrity. A grace interval is provided to give hystereses in the transition between states.

As shown in FIG. 17b(ii), at 260, if some loss of integrity is detected instantaneously in the D_stream to which the thread relates, the counter is incremented by a number of units according to the DLF. By incrementing the counter by more than one unit, yet decrementing it one unit at a time when no loss of integrity is detected, at 264, the system can be made sensitive to differing acceptable frame loss rates.

At 262, it is determine whether threshold DIM_HI_THR is overrun. If so, at 263, the MDM is alerted. Otherwise, the thread ends. If known loss of integrity is detected, the counter is decremented at 264, and at 265 it is determined whether the counter passes through the transition to the integrity state, by comparison with threshold DIM_LOW_THR shown in FIG. 17b(i). If so, an indication of a new integrity event is sent to the MDM.

The Workstation Resource Monitor, WRM, FIG. 17c

Description

The WRM provides a short-term indication of the state of various workstation resources such as CPU, Memory, and Network Bandwidth usage. For each resource, a monitor is created which can be in one of three possible states, namely SAFE, WARNING, or CRITICAL. The WRM_WARN and WRM_CRIT variables can be set to determine the utilization figures which will trigger these events. When the monitor changes state, a signal is send to alert the MDM.

The variable WRM_NUM_SAMPLES_i is used to determine the number of past samples which should be incorporated into the averaging calculation. This provides some defense against transients, however causes the monitor to react slower to the over-utilization of resources. WRM_NUM_SAMPLES_i should be sized based on the granularity of the TIMESLICE and the desired sensitivity of the monitor.

The variable WRM_DEGREE_i is used to maintain absolute quantity resource figures. It may be polled periodically by the MDM. An example could be the instantaneous network bandwidth usage at a particular instance, which may be required to monitor user-imposed tariff limits.

Variables

WRM_STATE_i={SAFE|WARNING|CRITICAL} State of resources monitor i.

WRM_NUM_SAMPLES_i (WNSi)=Number of previous samples to include in averaging process.

WRM_DEGREE_i=Resource specific absolute quantity

TIMESLICE=Fixed unit of time used for periodic polling of resources.

WRM_WARN=Determines the boundary between the SAFE and WARNING Event states.

WRM_CRIT=Determines the boundary between the WARNING and CRITICAL Event states.

FIG. 17c(i) illustrates the range of values for WRM_DEGREE-I, expressed as a percentage of its maximum value. The thresholds WRM_WARN, and WRM_CRIT, separate the range of possible values into safe, warning and critical states.

As shown in FIG. 17c(ii), a sample of the resource utilization is taken at 270, averaged at 271, and the state is updated at 272. If the state has changed, the MDM is alerted at 273.

Figure 17D:
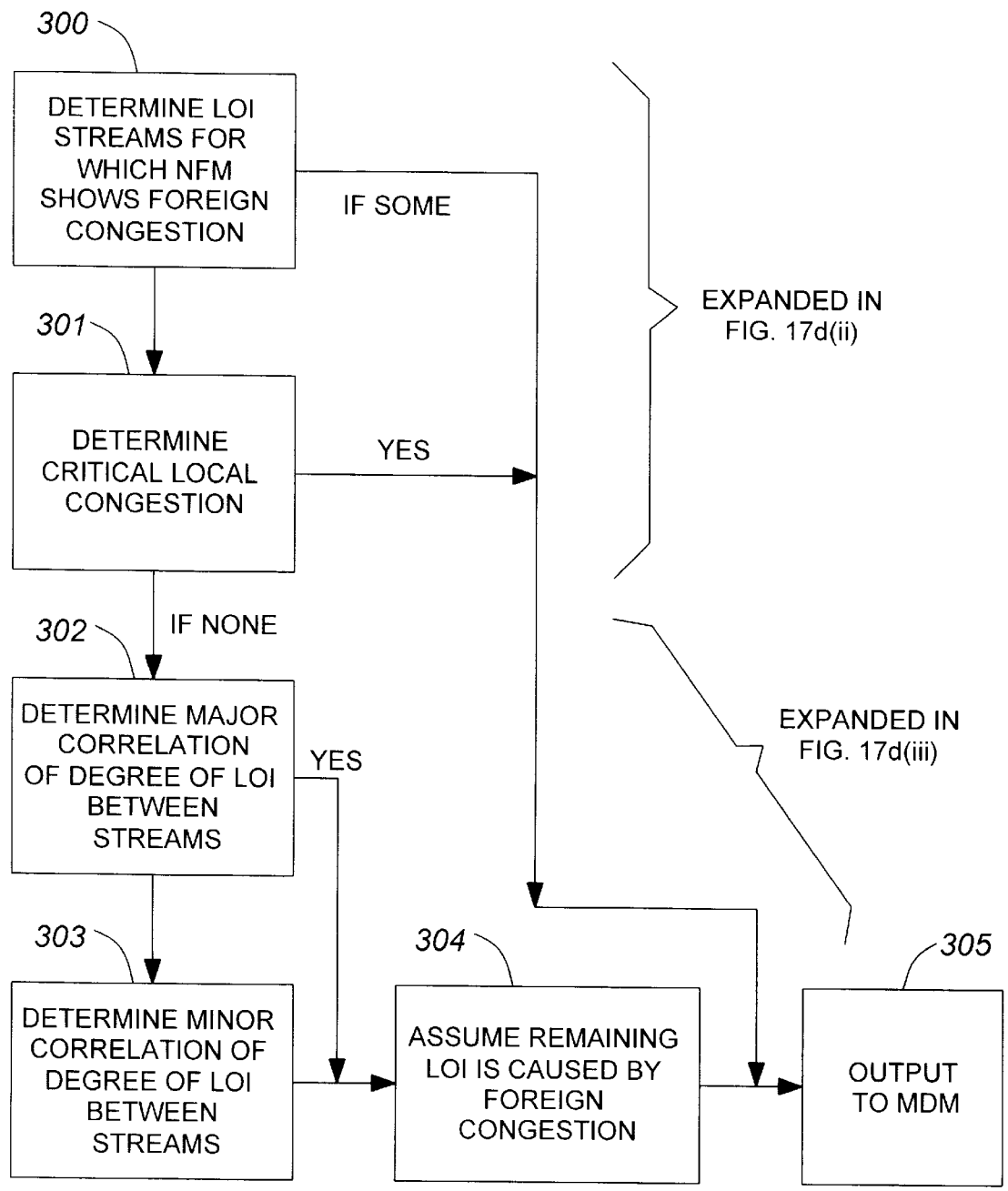
FIG. 17d(i) shows in schematic form the operation of the congestion analysis monitor of FIG. 6.

The Congestion Analysis Monitor (CAM) FIG. 17d

Description

The Congestion Analysis Monitor (CAM) accepts input signals from the D_Stream Integrity Monitor(s) (DIMs) and the Network Feedback Monitor (NFM) informing about any LOI or congestion experienced by incoming D_Streams. It processes these inputs in such a fashion that it may present as output to the Membership Decision Module (MDM), an indication as to which streams are experiencing LOCAL versus FOREIGN network congestion. The output information is presented in the form of two pairs of {Set, State} variables indicating the particular D_Stream ids experiencing either local or foreign congestion, as well as a state indicating the severity of the congestion. The process used to build these two pairs of variables is shown in FIG. 17d(i), in overview. The NFM is considered the chief indicator of foreign congestion and so these indications are immediately used to create the foreign congestion set CAM_F_SET at 300. If the DIM reports that a majority (CAM_CRIT_PER) of received D_Streams are experiencing some form of LOI, a CRITICAL LOCAL LOI is assumed at 301 (implying massive local congestion in the network) and is communicated to the MDM. Otherwise, a two step process is implemented to determine whether any sort of correlation exists between the degrees of LOI experienced by congested D_Streams. The first step at 302 attempts to identify whether there exists a subset of congested D_Streams (at least CAM_MAJ_PER %) that have DIM_DEGREEs within a standard deviation figure (CAM_MAJ_STD) of the complete set's MEAN ($\mu$). This first step tests for a very tightly correlated majority of D_Streams and would therefore indicate a CRITICAL congestion state which would be communicated to the MDM. If this situation is not found, the same is attempted again, however with looser constraints (CAM_MINOR_PER, CAM_MINOR_STD) at 303. This situation would simply raise a WARNING flag to the MDM.

If either of the above two conditions are found to exist, the stream ids conforming to these conditions are added to the CAM_L_SET and the CAM_L_STATE flag is set appropriately. After this point, any congested D_Streams remaining are deemed at 304 to be caused by foreign network congestion and are added to the set CAM_F_SET. CAM_F_STATE is updated appropriately. These results are then communicated to the MDM at 305.

Acronyms

CAM: Congestion Analysis Monitor, DIM: D_Stream Integrity Monitor, NFM: Network Feedback Monitor, MDM: Membership Decision Module Variables CAM_LOI_SET={set of stream ids}: an initially empty set, populated with all the stream ids indicated by the DIM as experiencing some LOI (DIM_STATE=LOI).

CAM_F_SET={set of stream ids}: an initially empty set, populated from the CAM_LOI_SET with the ids of streams deemed by the CAM to be suffering from a form of FOREIGN congestion.

CAM_F_STATE={SAFE|CRITICAL}: Indicates FOREIGN network congestion is suspected.

CAM_L_SET={set of stream ids}: an initially empty set, populated from the CAM_LOI_SET with the ids of streams deemed by the CAM to be suffering from a form of LOCAL congestion.

CAM_L_STATE={SAFE|WARNING|CRITICAL}: Indicates the level of LOCAL network congestion that is suspected MEAN ($\mu$): The statistical average of the DIM_DEGREEs of all streams in the set CAM_LOI_SET.

CAM_CRIT_PER: The minimum percentage of all streams that must show LOI for CRITICAL LOCAL CONGESTION to exist (typically about 90%).

CAM_MAJ_STD: A standard deviation figure.

CAM_MAJ_PER: The minimum percentage of all streams in the set CAM_LOI_SET that must show a DIM_DEGREE within a range of CAM_MAJ_STD about the MEAN($\mu$) (typically about 75%).

CAM_MINOR_STD: A standard deviation figure.

CAM_MINOR_PER: The minimum percentage of all streams in the set CAM_LOI_SET that must show a DIM_DEGREE within a range of CAM_MINOR_STD about the MEAN($\mu$) (typically about 50%).

TIMESLICE=Fixed unit of time used for periodic state calculations.

FIGS. 17*d*(ii) and 17*d*(iii) show the operation of the CAM in more detail. At 310, the CAM_LOI_SET is built showing all the monitored streams which have a loss of integrity. At 311, the CAM_F_SET is built by referring to the NFM for information on which of the streams in the CAM_LOI_SET show foreign congestion. If the CAM_F_SET is not empty an indication of the sets and states is passed to the MDM at 313. Otherwise, at 314, the critical local congestion is detected by reference to variable CAM_CRIT_PER. If there is critical local congestion, at 315, the CAM_L_SET is built by moving all streams from the CAM_LOI_SET, to the CAM_L_SET, even if there is a small percentage of streams which do not show loss of integrity. There is assumed to be a high risk that they will lose integrity.

If critical local congestion is not detected at 314, then as shown in FIG. 17*d*(iii), at 316, the preliminary step of calculating the mean degree of loss of integrity of all of the streams in the set CAM_LOI_SET is made.

At 317, it is determined if there is a large percentage of the streams in CAM_LOI_SET, having a degree of loss of integrity similar to the average, using a standard deviation figure. If so, the CAM_L_SET is built at 318, the remainder of the streams are assumed to have foreign congestion as the cause of the loss of integrity, at 321, and the new state and sets are communicated to the MDM at 322.

At 319, if there is no major correlation, minor correlation is determined using CAM_MINOR_PER to see if a smaller percentage of streams have a degree of loss of integrity close to the average. If so, the CAM_L_SET is built at 320, the level of local network congestion is set to the warning state, and remaining loss of integrity is assumed to be caused by foreign network congestion at 321. As before, the new sets and states are communicated to the MDM at 322.

Figure 17E:
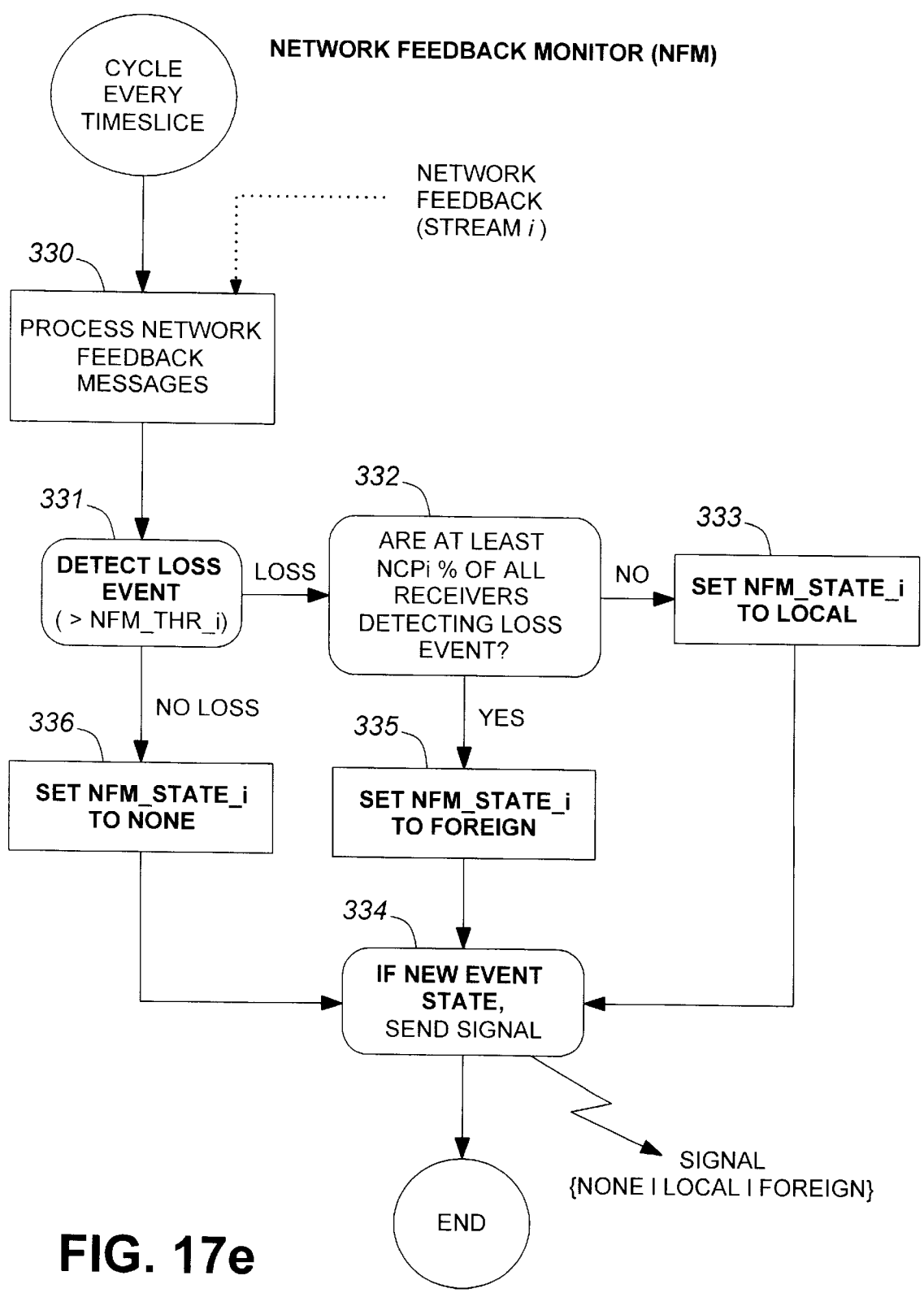
FIG. 17e shows in schematic form the operation of the network feedback monitor of FIG. 6.

The Network Feedback Monitor (NFM) FIG. 17*e*

Description

The Network Feedback Monitor (NFM) provides the Congestion Analysis Monitor (CAM) with a congestion state indication for all incoming D_Streams based on specific network feedback. These indications primarily enable the NFM to determine whether any observed LOI is due to local network impairments, or whether they are occurring at a foreign location within the network. The network feedback would be generated either by network components detecting corruption, or other receivers providing their own personal view of the network.

As shown in FIG. 17*e*, the NFM detects at 331 any LOI in the received network feedback messages processed at 330, relating to a given D_Stream. If it exceeds a particular threshold NFM_THR_i, it will attempt to determine the approximate location of the corruption. If the network feedback indicates that at least NFM_CRIT_PER_i % of all other users receiving this stream are experiencing similar LOI (step 332), then the corruption will be assumed to be in the network near the source of the stream. Thus it is labeled as FOREIGN (step 335), otherwise it will be labeled as LOCAL (step 333). In any case, the NFM attempts to make an informed decision about the origins of the LOI. The variable NFM_STATE_i is used to record the current source of corruption if any exists. In the case that the NFM_STATE_i changes, a signal is dispatched at step 334 informing the CAM of this new event.

An example of a possible form of network feedback is Real-Time Control Protocol (RTCP) packets which form part of the IETF's Real-Time Protocol (RTP). In this scenario, participants broadcast status messages informing others about the particulars of the media streams they are transmitting and receiving. Not only does this inform participants regarding what they should be receiving, but also provides an indication as to the quality being received by others.

Variables

NFM_STATE_i={NONE|LOCAL|FOREIGN} LOI source for D_Stream i

NFM_CRIT_PER_i (NCPi)=Minimum required percentage of receivers exhibiting LOI to constitute a FOREIGN LOI event NFM_THR_i=Loss threshold that must be exceeded in order for a LOI event to exist TIMESLICE=Fixed unit of time used for periodic state calculations.

Figure 18A:
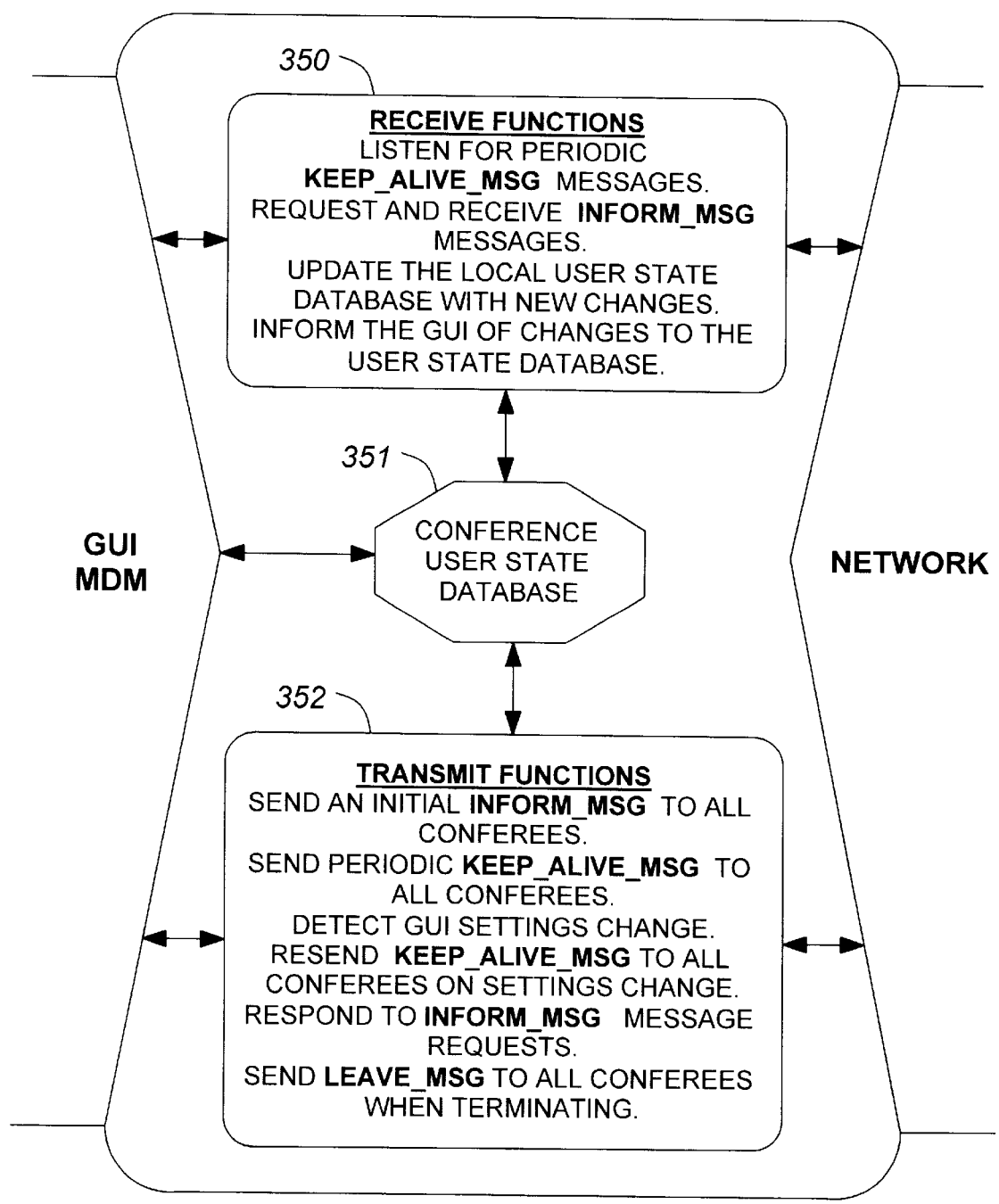
FIG. 18a shows in schematic form the functions of the conference awareness module of FIG. 5b.

The Conference Awareness Module, FIG. 18*a*

Description:

The Conference Awareness Module serves to provide the local user/conferee with a consistent view of the conference environment. This involves knowing who is participating in the conference as well as what media streams they are offering for reception. Three messages are defined below which serve to keep all conferees' views of the conference environment up-to-date.

The Conference Awareness Module maintains a Conference User State Database (351). This database is used to maintain all of the collected information about other conferees, the media streams they are offering and additionally, the local user's GUI settings for media stream receipt. It is therefore also accessible by the Graphical User Interface, as well as the Membership Decision Module for updating.

As shown in FIG. 18a, the functions of the conference awareness module can be divided into receive function 350 and transmit function 352. The receive functions include listening for periodic KEEP_ALIVE_MSG messages, requesting and receiving INFORM_MSG messages (see below), and updating the user state database.

The transmit functions include sending initial INFORM_MSG messages to all conferees, sending periodic KEEP_ALIVE_MSG messages to all conferees, resending KEEP_ALIVE_MSG messages if GUI settings change, responding to INFORM_MSG message requests, and sending a LEAVE_MSG message to all conferees when terminating.
Messages:

INFORM_MSG: This message is broadcast initially when a user joins a conference and then subsequently in a point-to-point fashion upon individual request. It provides personal information about a conferee such as name, still picture of user, mailing address, telephone numbers etc., however is not required in order to receive media streams. The format of this message is:

{Owner IP & Port Address, Name, Alias, Picture, Mailing Address, Telephone, E-Mail}

KEEP_ALIVE_MSG: Broadcast periodically (or whenever local settings change) to keep others aware of the local conferee's media stream offerings. This message also acts as a "heartbeat" to inform others of a conferee's existence. The format of this message is:

{Owner IP & Port Address, Media [Type, ID, Name, Multicast IP & Port Address], . . . , Media[. . . ]}

Owner IP & Port simply identify the owner of the media stream(s) as well as provide a "callback address" in the case an INFORM_MSG is required. A Media-tuple is required for each media stream being offered by the owner. It consists of a pre-assigned "type" identifier (such as CD-AUDIO), an "ID" to uniquely identify this media within a machine, a "Name" to be used within the graphical user interface, and a media stream Multicast IP and Port address on which to receive this stream. A conferee will be assumed to have left the conference environment if KEEP_ALIVE_MSG messages are not received after a timeout period. This is equivalent to a conferee having sent a LEAVE_MSG message.

LEAVE_MSG: This message is used to inform others of a conferee's intent to leave the conference environment. Once broadcast, this message will cause all others to remove any database information relating to the sender from their Conference User State Database. The format of this message is:

{Owner IP & Port Address, Close Indication}

Transmission And Reception Processes

Figure 18B:
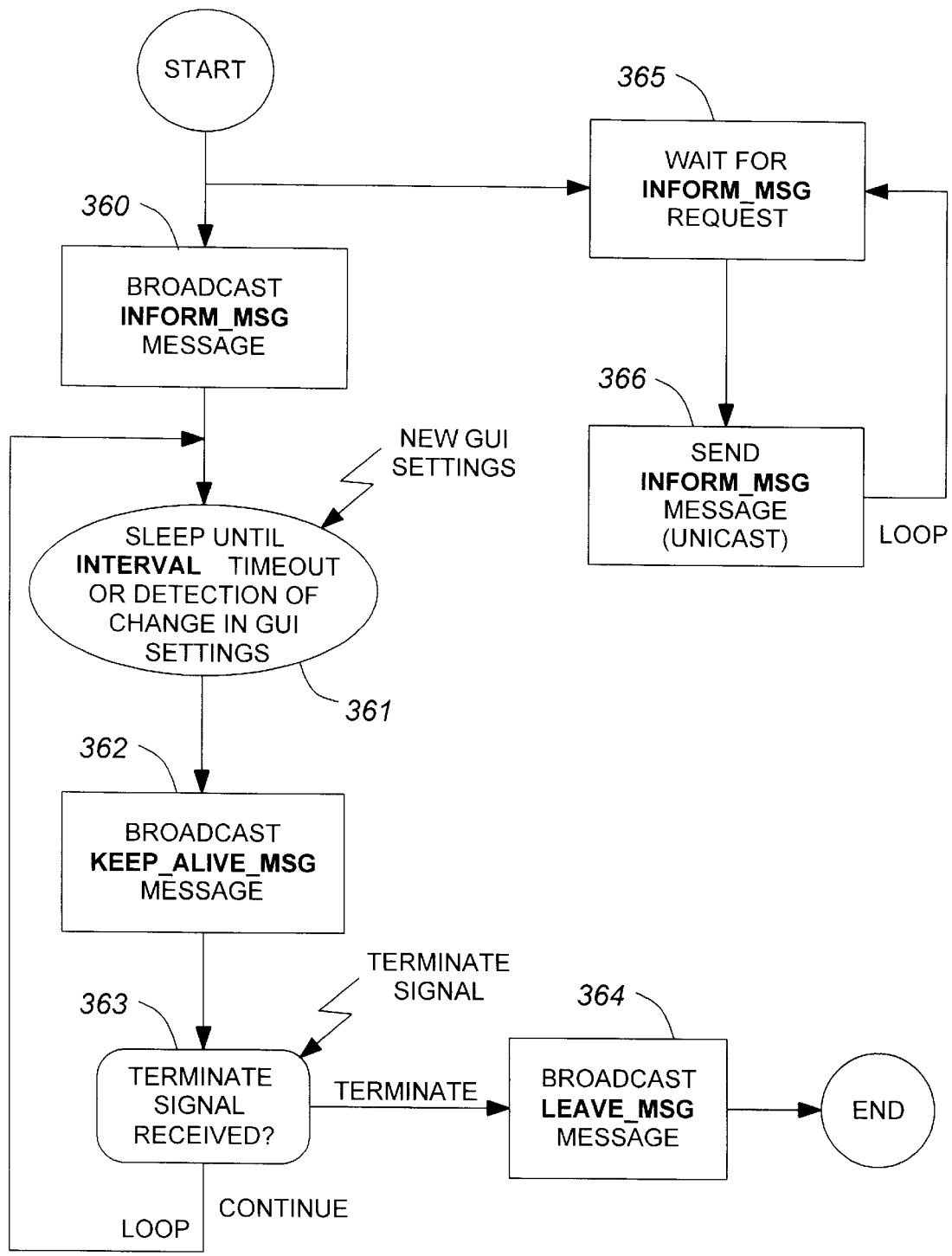

FIG. 18b shows the overall transmission process. An initial INFORM_MSG message is broadcast at 360. At 361 the process waits for a time out interval or a change in GUI settings, before broadcasting a KEEP_ALIVE_MSG message at 362. At 363, a loop back is made to the start of step 361, unless a terminate signal has been received, in which case a LEAVE_MSG message is broadcast at 364. In parallel, at step 365, the process responds to an INFORM_MSG request, and sends in point to point fashion its own INFORM_MSG message on request.

Figure 18C:
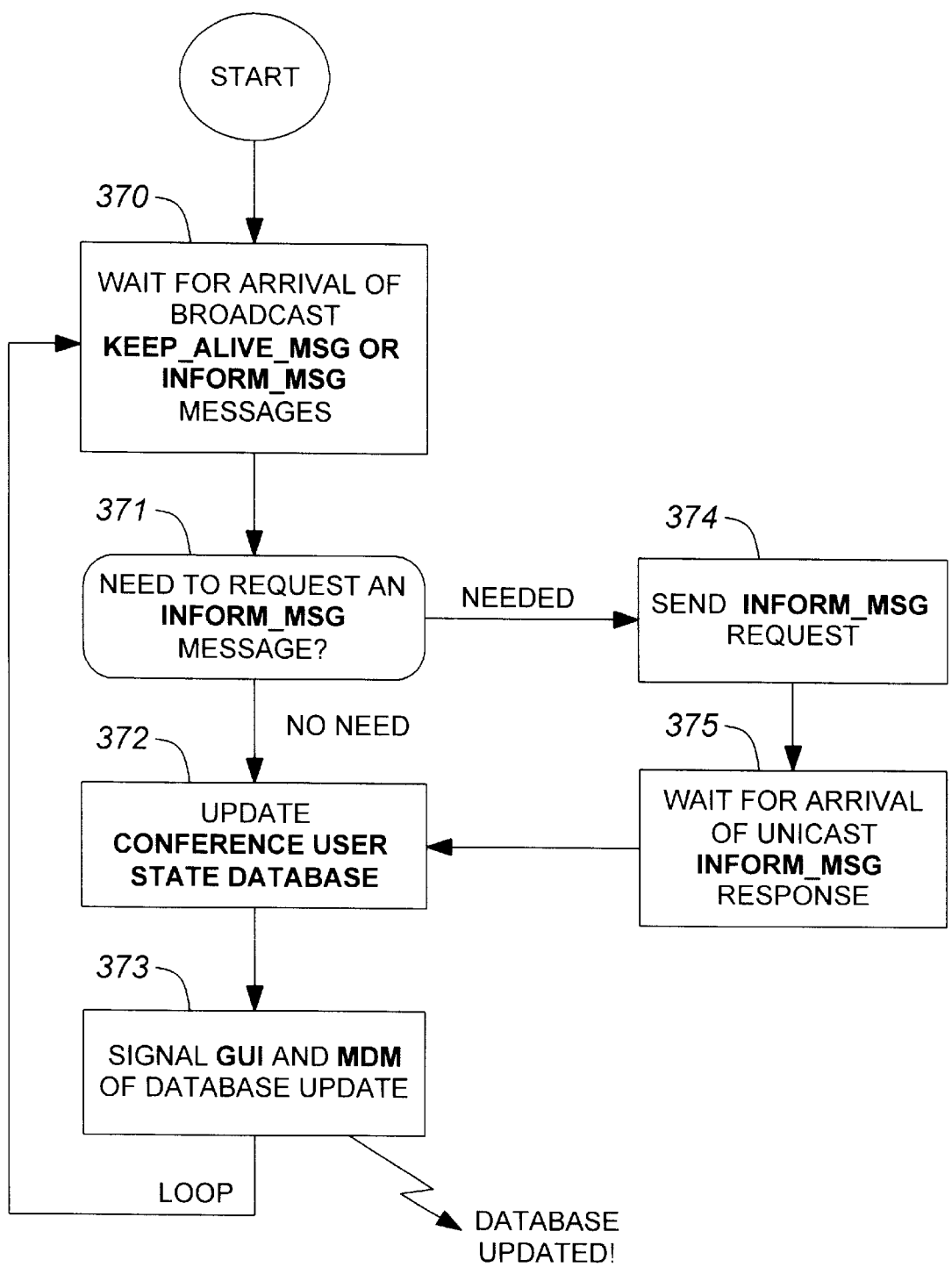

FIG. 18c shows the reception process for the conference awareness module. At 370, the process waits for the arrival of broadcast KEEP_ALIVE_MSG messages or INFORM_MSG messages 370. At 371, if there is a need to request an INFORM_MSG message to obtain information about another user, the INFORM_MSG request is sent at 374, and a response awaited at 375. If necessary, the conference user state database is updated at 372, and the GUI and MDM are alerted of the update at 373, and the loop is continued by returning to step 370.

Other parts of the terminal shown in FIG. 5b will now be described.

Figure 19:
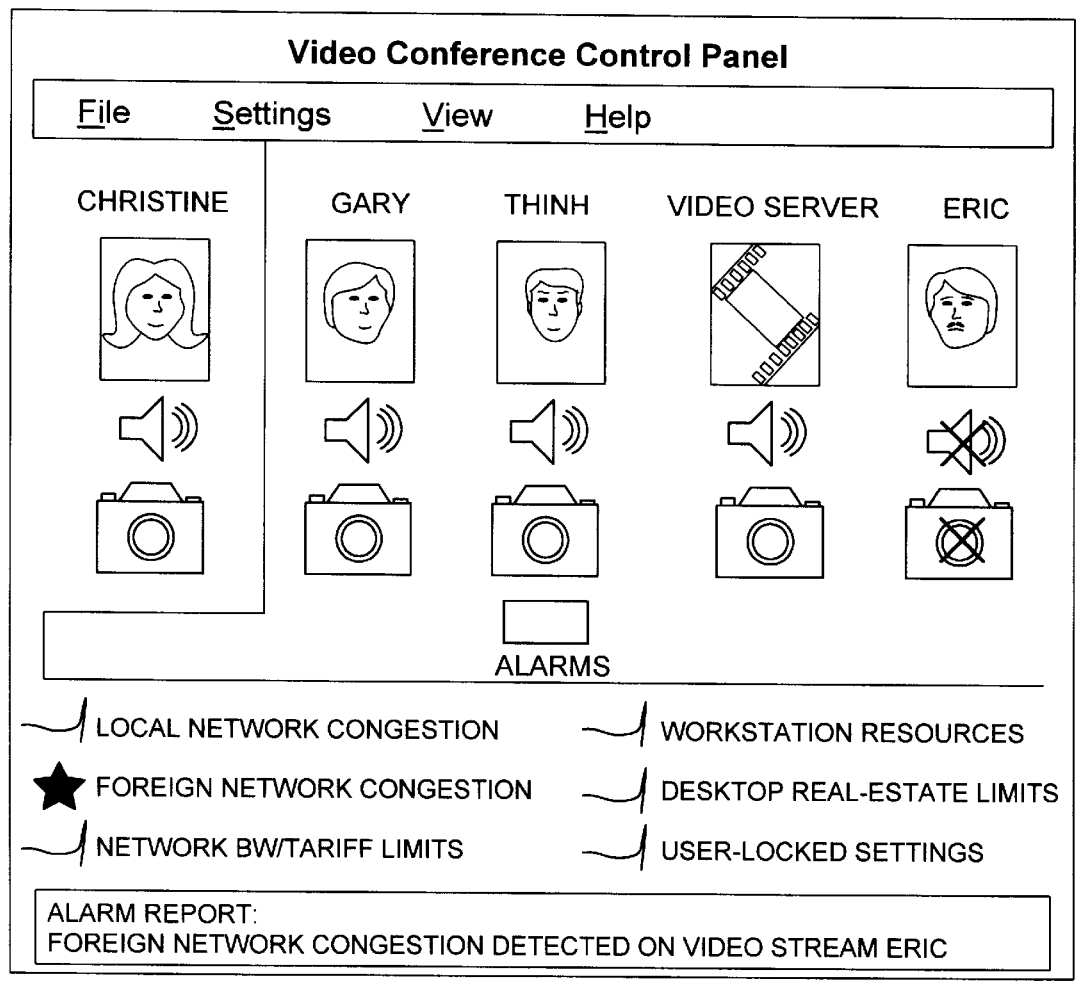
FIG. 19 shows an embodiment of the graphical user interface of FIG. 5b.

Graphical User Interface FIG. 19

The Graphical User Interface (GUI) has four primary functions which enable a user to interact with and control a conferencing environment:

1. Offer an accurate view of the conference environment: The GUI provides a detailed view of all conferees participating in the conference environment via a small still picture of the user, personal information (such as name and mailing address) as well as small icons representing the media streams they are offering (e.g. audio, video or slides). As users join and leave the conference environment, or change the media streams they are offering, the GUI will update its view automatically.

2. Enable a user to specify a customized viewing policy: Not only are offered media streams represented visually via icons, but these may be manipulated by the local user to operate in several modes. The video icon which is represented by a small camera is a three state toggle. By clicking on it with a mouse, the user is able to toggle between MUTE, LOCKED and TRIGGERED modes. The MUTE mode indicates that the user never wishes to see this video stream. The LOCKED mode indicates that the user wishes to always view this video stream independent of available resources. The TRIGGERED mode indicates that the user wishes only to see this video stream when the associated audio stream is active and resources allow. Other media types may be operated in a similar fashion. A default automated stream viewing policy is offered, which may optionally be overridden by the user.

3. Enable a user to control the extent of resource limitations: A variety of resource may be monitored by the system in order to provide the optimal conference view of TRIGGERED streams. These include networking resources, computing resources, explicit tariff limitations and physical desktop resources. The user is free to configure these resource settings as strictly or loosely as desired in order to satisfy their own requirements.

4. Provide visual feedback about resource utilization: The GUI also provides an indication to the user as to the resource(s) that are imposing restrictions on the selected viewing policy. The visual alarm display allows the user to ascertain which resources are at a critical level of utilization and hence are deteriorating the resulting display. Users may by default choose to allow the MDM to continue limiting the display according to resource availability or alternately, override the resource limits feature thus reducing the resulting quality and fidelity of the media presentation. The alarm report provides a verbose report relating to the observed alarms.

As shown in FIG. 19, there may be one panel for video conference control including small still pictures of users. Other windows (not shown) on the same display can show the selected video streams from other users. According to the capabilities of the terminal, these windows may be moved and sized as appropriate, wider control of the user, or according to a users controlled policy, e.g. to highlight chosen conferees.

Policy Examples for Dynamic Multicast Group Membership

The control of the multiparty video conferencing environment, also termed "switched presence control" is achieved through dynamic membership within various multicast groups. A conferee selects a desired virtual view of the conference environment, which implies a policy dictating what events will trigger joins and leaves from network-based multicast groups. Many policies may be defined based on the nature of the conference such as a lecture, group meeting, or hosted tour. As an example, assume that a join event is triggered by audio activity (regular dialog) lasting more than $T_J$ seconds and a leave event is triggered by a silent period lasting in excess of $T_L$ seconds. In most cases where video conferences consist of natural dialogue between participants, the silence period threshold ($T_L$) will be much greater than the activity threshold ($T_J$). Typical values for $T_L$ would be in the order of tens or hundreds of seconds, whereas $T_J$ would typically be less than ten seconds. The following policies could be implemented:

a) See video of j most recent speakers

In this policy, the audio streams of all conferees are monitored to determine the j most recent speakers, based on join events. The video streams associated with each of these audio streams are displayed locally which entails network signaling on the user's part to initiate membership within multicast groups. Audio streams are continually monitored to detect leave events which would also entail network signaling to request removal from a multicast group. This is a dynamic and on-going process which guarantees that not more than j video windows will be displayed at any one time. This policy is particularly useful for large group meetings where many conferees participate in an uncoordinated fashion.

b) See video of a set of k speakers, and additionally the j most recent speakers This policy operates in a similar fashion to the one above, however the user chooses a static set of k conferees who are always to be viewed, in addition to the j most recent speakers. This option is particularly useful for large lecture scenarios or panel discussions where there is a primary set of conferees contributing throughout the length of the conference, and additionally an arbitrary set of conferees who may contribute periodically (e.g. to ask questions).

c) Slide/Whiteboard activity priority

This policy places a high priority on the display of any activity taking place on a slide display or whiteboard. Its triggering event is based on any sort of activity such as a new slide being transferred, pointer motion on a slide, or any detected changes on the whiteboard. Any of these events would cause the slide/whiteboard to be displayed in the foreground of the computer display, thus potentially occluding some or all video windows. Though multicast group membership for slide/whiteboard data would be static, it could have implications on video multicast group membership based on the duration of activity. It may be worthwhile to close video windows (remove multicast group membership) during these periods of slide/whiteboard activity.

d) Chairperson control

It is feasible that a particular conferee be designated as the chairperson in order to provide a unified view of the conference to all conferees. The chairperson would implement any combination of the above mentioned or alternate policies and then would use an out-of-band communication link to control each conferee's view. This would be somewhat reminiscent of the centralized approach to video conferencing, however could be appropriate in some situations.

The above policies are merely examples, however they demonstrate the advantages of implementing multicast groups for transporting individual media streams. Many other policies could be implemented such as stream priorities and/or stream preemption, based on particular needs.

Other parts of the terminal shown in FIG. 5b will now be described.

D/T Stream (Reception) Processing Modules 28, 34

The D or T_Stream (Reception) Processing Modules have the generic function of receiving a stream from a network connection, and performing all of the necessary steps required for the proper presentation of the stream to the user. These will be specific to the type of media that constitutes the stream, however there are some common characteristics as follows:

1. Network Reception: This step involves the reception of data blocks, de-fragmentation of these blocks to produce protocol data units (PDUs) and the subsequent processing of these PDUs to retrieve the actual payload data that constitutes the stream.
2. Decoding: This second step is concerned with media specific decoding and/or decompression algorithms required to restore the transmitted data to its original form. In the case of motion video for example, algorithms such as ISO/IEC's Motion-JPEG or MPEG are used for compression in order to reduce the required transmission bandwidth.
3. Pre-processing: The third step is also media specific and involves pre-processing to transform the media in some fashion, or provide inter-stream or intra-stream synchronization. Again using motion video as an example, this could involve a conversion of the resolution or color space of the original stream before presentation, or alternately synchronization may be required with an audio stream.
4. Presentation: This final step involves the display of the resulting stream to a presentation output device. In the case of motion video, this is obviously some form of video display such as a computer monitor or television.

The D/T_Stream (Reception) Processing Module's implementation is obviously media specific and a matter of design choice. Depending on the media type being processed, it even may become a major part of a complex terminal but well established principles can be followed by one skilled in the art, to implement this part.

D/T Stream (Transmission) Processing Modules 41, 44

The D or T_Stream (Transmission) Processing Modules have the generic function of performing all of the necessary steps of capturing a live analog signal, converting it to a digital form and subsequently transmitting it over a network connection. This is somewhat specific to the type of media that constitutes the stream, however there are some common characteristics as follows:

1. Capture Process: The capture process involves the use of an analog input device to record a live signal, digitize it and then present it to the local computing environment for consumption. A very simple example is that of an NTSC video camera and accompanying digital video capture card, with which computers are typically equipped today.
2. Coding Process: Upon digitization of the live signal, a coding process is typically required. This usually takes the form of pre-processing and compression functions. Digital video for example is quite bulky and therefore requires compression. A pre-processing function may be required for audio for example, to alter volume levels or mix various audio signals together before compression occurs.

3. Stream Creation: Once the digital media has been coded, a stream must be created. This is usually achieved by interleaving media units with media-specific headers. Media headers usually incorporate absolute or relative timestamps, sequence numbers and media encoding identifiers. These headers serve to identify the nature of the media within the stream, enable synchronization at the receiver and provide a common stream structure that may be recognized at the receiver(s).

4. Network Transmission: The final step in the process involves the transmission of the newly formed stream on a network connection. An obvious requirement before the transmission process may begin is network signaling. Network-specific signaling messages must be exchanged to inform the network and receiving party(s) of the data type to be transmitted, as well as the connection topology desired. Once a connection path is successfully established, the media stream may be transmitted.

The D/T_Stream (Transmission) Processing Module's implementation is obviously media specific and a matter of design choice. According to the media type being processed, well established principles can be followed by one skilled in the art to implement these parts.

Network Signaling Modules 29, 35, 42, 45

The Network Signaling Module has various functions within the Audio/Video Reception/Transmission Processes. Its chief function is to respond to requests made by the Command & Control Process to either become a member of a particular network connection (add-request), or to remove its membership (drop-request) from a particular network connection. The complexity arises in the mapping that is required between simple add/drop requests, to the more complex network specific signaling protocols that exist today. As an example, Internet Protocol (IP) based networks utilize a whole family of protocols produced by the Internet Engineering Task Force (IETF), of which the Internet Group Management Protocol (IGMP), Real-Time Control Protocol (RTCP) and Resource ReSerVation Protocol (RSVP) belong. IGMP is used to enable a host to become a member of an IP multicast connection, whereas RSVP is used to reserve network resources for network connection(s). Thus a Command & Control add-request would necessitate that the Network Signaling Module issue an IGMP_REPORT signaling message as well as the appropriate RSVP_RESERVATION signaling messages. Throughout the life of the connection, the network signaling module would also be responsible for transmitting/receiving the appropriate RTCP messages and responding in an appropriate fashion. In addition, this module would be responsible for dealing with any exception conditions that may arise, according to the network environment in which it operates.

Other system considerations will now discussed.

Media Stream Synchronization

The single most important element of any real-time multimedia communication system is the synchronization mechanism which must be employed in order to guarantee timely and sensory-appealing playback of multimedia streams to a user. One synchronization philosophy is based loosely on concepts expressed in [ref1], [ref2] and [ref3] (below). The philosophy can be generalized as master/slave synchronization with a delay/drop policy and dictates the following: Given n real-time media streams which are to be received at a workstation and subsequently synchronized and displayed, one of these streams is classified as the master and the remaining n-1 are classified as slave streams. The master stream is usually chosen as the one which requires the most stringent QoS (usually audio due to its extreme sensitivity to jitter) and hence receives the highest priority of service within the end-system. All slave streams are synchronized using the master stream as a reference. Since the master stream is processed with the highest priority, we assume that all of its presentation deadlines are met in an end-to-end fashion. The slave streams are then processed and displayed using the master as a time reference, and at a lower priority. Assuming a resource (such as the network or end-system) is not able to process a slave stream in a timely enough fashion, the delay/drop policy is implemented. Essentially, if a slave stream's data unit arrives late and misses its deadline, it will simply be thrown out. Otherwise, if it happens to arrive early before its scheduled display time, it will be delayed for later display.

The above philosophy may prove useful for the following reasons. There is a general assumption that all the components (network and end-system) in the system are performant, largely error free and bound in terms of the delay and jitter they inject into a media stream. Therefore, for the most part there will be little need to interrupt the natural flow of the media stream. Thus a lightweight synchronization scheme is desirable. Additionally, since we are dealing with live media streams, a minimum end-to-end delay is also desirable to enable conferees to converse in a natural fashion. End-to-end performance is favored over absolute stream continuity, which supports the need for a simple, lightweight synchronization protocol. Ultimately, the increased bandwidth offered by newer networks based on ATM or IP implies a reduction in processing demands due to the reduced degree of media compression required. Coupled with the reduced processing overhead associated with ATM's simplistic protocol stack, for example, overall this reduces end-to-end latencies and hence the necessity for complex, compute intensive synchronization protocols. This overall decrease in end-system processing requirements is the fundamental advantage of adopting a network transport facility such as IP or ATM.

Platform:

The process described above could advantageously be implemented using the C programming language because of its large installed base, versatility and speed. Motif/XWindows could be used to produce the GUI and a POSIX.4 compliant library along with Solaris Threads be employed to support real-time functions. Suitable hardware could be:

Sun SPARC 20 workstation running Solaris 2.4 OS: This workstation configuration lends well to the development of real-time multimedia applications. The Sun SPARC's SBus is supported by many third party hardware vendors. Additionally, the SPARC workstation sports some impressive processing and bus bandwidth figures which are inherently required in any multimedia application. Solaris 2.4 has fairly complete support of IEEE's POSIX.4 real-time programming standard. Additionally, it has support for multi-threading facilities which provide the equivalent of the POSIX.4a standard. Solaris 2.4 also defines a real-time processing class which enable processes to obtain real-time service and scheduling in an otherwise non-deterministic scheduling environment.

Native Sun Audio CODEC: Because Sun's native audio device is bundled with the computer and is fully-featured, it is essentially a "shoe-in". The CODEC possesses both D/A and A/D converters which are able to operate at a multitude of encoding rates and formats ranging from basic $\mu$-law up to CD quality audio. The device contains microphone and line-level inputs as well as headphone and line-level outputs.

Parallax PowerVideo Card: Parallax's PowerVideo Card is suitable because of its on-board Motion JPEG CODEC. It has a video development environment including a complete set of X/Motif API widget libraries which allow for full control of the CODEC hardware thus off-loading any compression/decompression functions from the main CPU. The video hardware is capable of providing the encoding and decoding of a Motion JPEG video stream of 640×480 pixels, 24 bit color at frame rates in excess of 25 fps in real-time. As video resolution is decreased, additional video streams may be processed in real-time.

Although IP may be preferred to ATM, owing to wider usage, if ATM is used, a suitable network interface card would be: FORE SBA-200 ATM NIC: Useful features are offered by the ATM Forum's well known UNI v4.0 standard. These include the negotiation of QoS parameters on a per-connection basis as well as the dynamic establishment of point-to-multipoint ATM connections using SVCs. The advantage of employing FORE Systems ATM NIC was that it offered an API library interface to much of this functionality via its proprietary SPANS signaling protocol. This signaling functionality may be instrumental.

Designing for Performance and Recovery

The design of a real-time multimedia application requires a certain awareness of issues which must be considered when dealing with real-time deadlines. Also, the multimedia aspect of such an application immediately implies potentially high bandwidth data transfers coupled with the need for media synchronization techniques. Ultimately, a certain level of robustness and recoverability from violated time deadlines is a necessity. Some of these issues and the methods adopted to address them are highlighted as follows:

Exploit Available Soft Real-time Facilities

The bane of current workstations is their Time Sharing Operating Systems (TS-OSs). Ironically, most workstations have audio/visual facilities, however no support for hard real-time processing. Hard real-time differs from soft real-time in that the workstation hardware and software has been engineered specifically to enable processes to negotiate a QoS contract which the processing subsystem honors. Soft real-time takes the form of software based facilities which attempt to offer some real-time processing characteristics to executing processes. This may take the form of a preemptive operating system, a scheduler which supports a real-time class or programming libraries which allow for lightweight processes or threads. All these soft solutions tend to aid the designer in achieving real-time performance and should therefore be exploited, however these aren't nearly as effective as a hard Real-Time Operating System (RT-OS).

Recovery From Media Stream Discontinuity

Loss of media stream continuity is usually caused by the network transport more so than by the local end-system. If ATM is being used for transport, losses are possible since ATM only provides statistical guarantees for error-free data delivery. Even though error rates should be quite low within an ATM network, the application should be aware that losses are possible and should deal with such situations in a fashion which disrupts the perceived quality of the media presentation as little as possible. Such mechanisms are achieved using complex synchronization algorithms which deal with media stream discontinuity.

Inter-media and Intra-media Synchronization

Any multimedia system inherently requires both inter-stream and intra-stream synchronization which is dependent upon the media streams being presented. For example, if related audio and video streams are being presented, studies indicate that the maximum inter-stream skew should be limited to 80 milliseconds and that the one way delay from sender to receiver should be limited to 150 milliseconds [ref4]. For the multimedia application to be perceived as performing correctly, these real-time constraints must be respected.

Proper Use of Buffers

Buffers are commonly used within multimedia applications in order to absorb jitter, remove skews and delay media stream presentation. Though they can be quite useful, the designer must carefully size buffers so that they do not have a negative impact on overall performance. Small buffers are attractive since they tend to reduce end-to-end delays, however these tend to incur high processing overheads within the operating system which can degrade performance. Conversely, large buffers tend to be much more efficient from an OS perspective, however they force a coarser grained control of media units and increase transmission latency which is not ideal for continuous media.

Exploit Hardware for Performance Gains

The designer must be aware of the options available in the form of hardware modules. In the majority of cases, a hardware vs. software implementation of some functionality is more performant and usually significantly more so. A hardware based Motion JPEG CODEC, audio digitizer, and AAL5 SAR implementation are preferred. All of these hardware implementations off-load processing from the main end-system CPU thus making the system much more performant.

Lightweight Software Modules

A key to designing software modules is to keep them as simple and as lightweight as possible. Certain functions such as mixing and synchronization algorithms can be CPU intensive. However, an efficient design which removes any redundancy or extraneous functionality can make a significant improvement. A synchronization algorithm such as the one discussed above acknowledges the need for a multilevel synchronization scheme. A very tight (CPU intensive) synchronization mode is only required when synchronization is lost which is infrequent, and so a three level synchronization scheme can be adopted. Coding style can be a major factor in reducing the CPU load of a particular software module. Various code tuning and optimization pointers can be found in the many available coding performance and tuning references.

Respect QoS Constraints for Media Streams

Multimedia processing implies that media streams must receive a certain quality of service in an end-to-end fashion. If the network transport is a high bandwidth, low latency medium such as ATM, and the end-systems possess less than adequate processing power, the system will never function well enough to meet the QoS demands placed by the media streams. Consequently, a complex synchronization algorithm running on the end-systems will be of little use, and will serve to be more of a detriment to the overall performance of the system.

Design for Scalability and Robustness

The multimedia system must be designed such that it is scaleable and robust in an end-to-end fashion. In a video conference application, it is quite feasible to have six or eight conferees participating in a video conference. The prototype should be designed in such a fashion that it is capable of processing the audio and video streams of six conferees as a minimum. If the Motion JPEG CODEC is unable to process more than three video streams for example, this reduces much of the functionality and strength.

References

[1] Herng-Yow Chen, Ja-Ling Wu, MultiSync: A Synchronization Model for Multimedia Systems, IEEE Journal on Selected Areas in Communications, Vol. 14, No. 1, January 1996

[2] Cosmos Nicolaou, An Architecture for Real-Time Multimedia Communication Systems, IEEE Journal on Selected Areas in Communications, Vol. 8, No. 3, April 1990

[3] Xiaobao Chen, End-to-End Synchronization Control Support for Multiservice Applications, Computer laboratory, University of Cambridge, November 1995

[4] Ralf Steinmetz, Gerold Blakowski, A Media Synchronization Survey: Reference Model, Specification, and Case Studies, IEEE Journal on Selected Areas in Communications, Vol. 14, No. 1, January 1996

Invention Advantages

There are several advantages that promote the use of multicast capable networks such as IP based packet networks, or ATM multicast SVCs to realize a switched presence multiparty video conferencing environment. These are aided by advancements in computer processing and networking bandwidth available to common desktop personal computer users. Some of the advantages are highlighted as follows:

a) Conferees may construct their own unique view of the conference environment

In contrast to the centralized "P×64" based approach to video conferencing, a distributed approach using multicast groups enables conferees to arbitrarily select particular audio and video streams to receive (Switched Presence Control). Each conferee is therefore able to tailor his/her view of the conference environment to their own specific liking. A distributed approach also offers an additional level of robustness due to the lack of any central point of failure.

b) Processing and networking resources do not become limitations

In reality, not all conferees will possess the most performant hardware (such as video CODECs) or necessary network bandwidth required to process large amounts of digital media. The switched presence approach enables each conferee to alter their conference view to suit their technical resource limitations.

c) Solves the human cognitive scalability problem

Switched presence addresses the issues of scalability which accompany large multiparty video conferences. Human cognitive scalability issues are addressed by controlling the number of media streams that are simultaneously presented to the user at any point in time. This is a dynamic process which recognizes the fact that the primary speaker (s) within a group communication may be constantly changing.

d) Application layer, receiver-based, reactive congestion avoidance technique

The switched presence approach is an extremely powerful mechanism for dealing with transient network congestion, especially occurring close to the receiver. The receiver can monitor the integrity of media streams at the application level for loss or corruption. In the case that on-going errors are detected in a correlated fashion between a majority of received streams (indicating local congestion), measures can be taken to reduce this congestion by aborting the reception of lower priority (based on application context) stream(s). This reactive congestion avoidance technique would be most appropriate for network environments such as IP which lack a QoS mechanism or are based on soft-QoS (e.g. Resource Reservation Protocol (RSVP)). Obviously, on-going errors identified in an individual stream would indicate possible congestion within the network closer to the sender, however it may still be desirable to abort this stream if the perceived quality degrades significantly.

Different forms of network-based feedback could prove useful in identifying the source of congestion more precisely. Many mechanisms have been proposed such as Resource Management (RM) cells in ATM, RSVP path/reservation messages, and Real Time Control Protocol (RTCP) packets in Real Time Protocol (RTP). None of these approaches have been fully proven as effective feedback mechanisms that will be functional on a large scale and at the same time widely implemented by vendors, however all hold much promise.

e) Cost effective solution for bandwidth tariffed networks

In the case where network tariffs are based on bandwidth usage, switched presence allows a unique means of reducing bandwidth costs while maintaining a satisfying and appealing conferencing experience.

f) Can exploit scaleable video encoding algorithms In some multiparty video conferences, conferees may wish to transmit at very high quality video resolution using a scaleable encoding algorithm such as High Definition Television (HDTV). These scaleable encoding algorithms enable lower quality receiver decoding at less than maximum resolution. The encoding process is performed in multiple layers, where each layer builds progressively on the previous one to produce the maximum resolution. Assuming that each layer is transmitted to a different multicast group, each conferee may choose a subset of multicast groups from which to receive based on the resolution that it can support, without compromising the original video quality for others. This is a unique advantage of using a switched presence topology based on multicast groups.

Many currently standardized video conferencing architectures adopt a frame-based versus packet-based approach to digital media transmission. In the frame based approach, media streams are interleaved at the source and so these streams maintain specific relational and positional significance within the frame. Upon reception of an ITU H.320 frame for example, the receiver knows the exact contents of the frame (e.g. media stream types), their location within the frame, as well as their temporal relation. This eases the chore of intrastream and interstream synchronization at the receiver, however it forces all receivers to receive the exact same quality and quantity of media streams, namely everything. As networks become less connection oriented (e.g. POTS, ISDN) and more packet-based (e.g. legacy LANs and even ATM!), a packet-oriented approach becomes more desirable. A packet approach enables media stream separation, thus allowing receivers to arbitrarily choose individual streams, while benefiting from such networking facilities as QoS and dynamic multicast connectivity which can be tailored to the individual media stream being transmitted. While they are not in the majority, packet based video conferencing architectures are being developed. ITU's H.323 is a packet oriented conferencing standard which enables stream separation at the network level.

The problem when deploying conference environments on a large scale will be scalability. Technology and the human perception are two limiting factors to the number of participants able to attend a single conference. The switched presence approach discussed above deals with both these factors.

Digital media stream separation is used within a multicast-capable network to allow conferees to "tap" into desired media streams. This not only deals with the scalability problem, but also offers additional advantages such as cost effective use of bandwidth and the ability to exploit scaleable video encoding algorithms.

Though the rapidly advancing pace of technology commonly discounts technical scalability arguments as irrelevant, human cognitive abilities will likely not scale with time. This promotes switched presence as a key solution to such problems.

Alternative Embodiments

Figure 20:
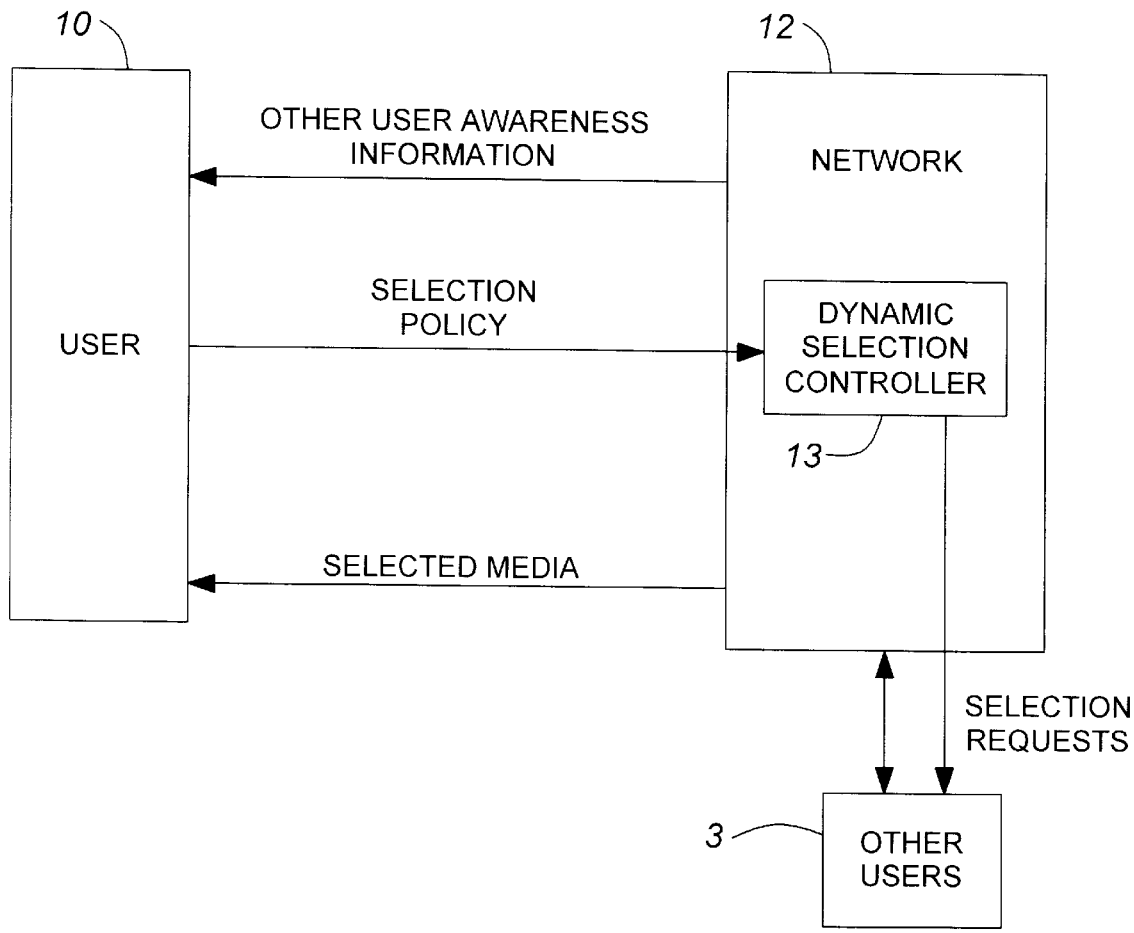
FIGS. 20 and 21 illustrate in schematic form alternative embodiments of the invention.

FIG. 20 shows an alternative arrangement in which the dynamic selection controller 13 has been implemented in part of the network 12, rather than in the users terminal. It could be located remotely from the users terminal, and be fed information relating to network and user terminal conditions (not shown), and user selection policy, using the network. In addition, or as an alternative, the formation of the composite video stream for the user, could take place remotely from the user, e.g. at a local switch in the network. This would have the disadvantage of requiring specialised equipment in the switch, e.g. in the linecard, if the network is the telephone network, but would have the advantage of reducing the bandwidth needed in the last link, the subscriber line to the users terminal, which could be a critical path. It might also simplify the equipment needed in the subscriber end, by obviating the need for display processing capability to create the composite image from multiple received video streams, and thus encourage rapid take-up by consumers, and make maintenance and upgrading easier, for the equipment centralised in the local switch.

Figure 21:
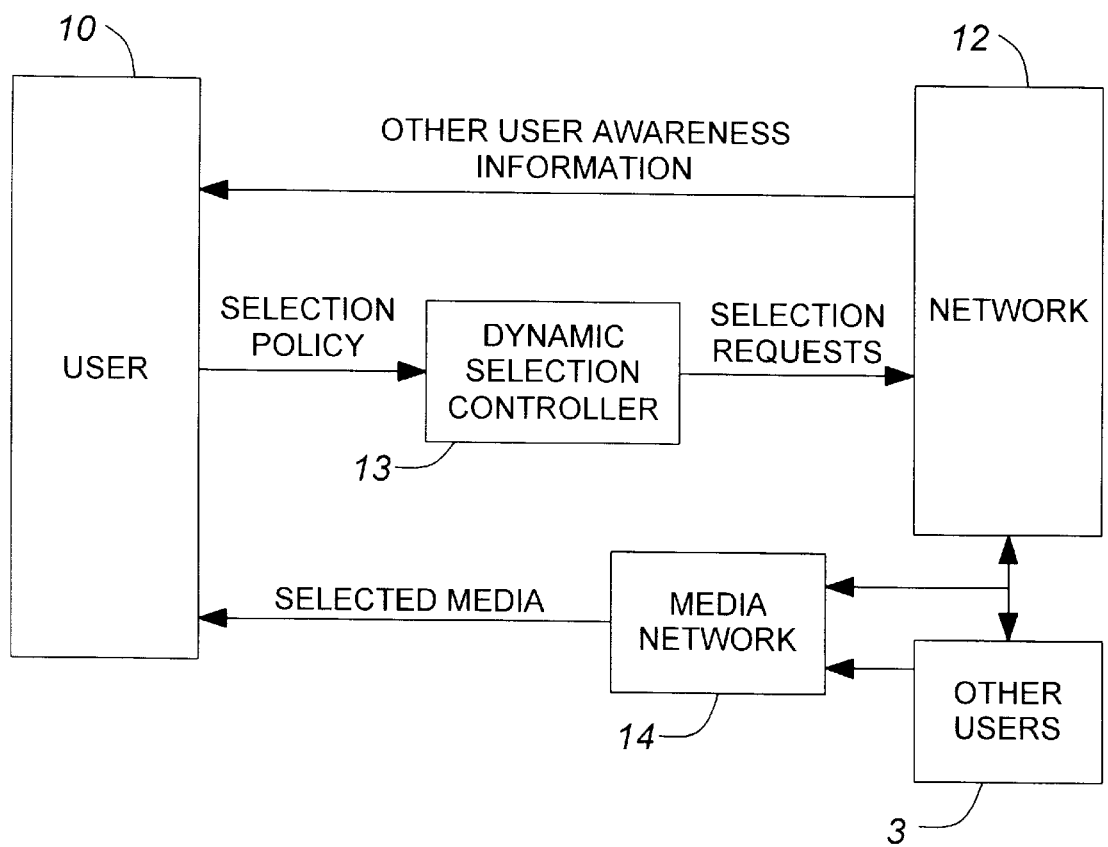

FIG. 21 shows another alternative embodiment in which the media streams are delivered by a separate media network 14 to the network 12 used for passing overhead such as awareness information and selection requests. This media network may be a higher bandwidth network such as a cable network capable of delivering multiple video streams to the user. It may link users directly to each other and thus in a conferencing arrangement, be used directly by each user for received and transmitted media streams. However, since only one video stream need be transmitted, while multiple streams may need to be received, it may be advantageous to use the higher bandwidth network 14 for receiving multiple streams, and the lower bandwidth network 12, for transmitting the single stream. The higher bandwidth network, (e.g. an existing cable network which may be substantially unidirectional or asymmetric anyway) would connect each user to the lower bandwidth network (e.g. the telephone network), e.g. by a data multiplexer at a local cable hub or distribution control point, linked to multiple telephone lines of the telephone network. Another reason for using a separate media network to deliver the multiple streams would be to offer higher levels of quality, e.g. latency, and reliability aswell as bandwidth. Users may be willing to pay for such benefits if they are not available from networks such as the internet.

Other variations can be envisaged within the scope of the invention.

What is claimed is:

1. A method of selecting for display one or more streams from a number of real-time media streams available to be transmitted across a communications network for display on respective terminals of a first, and at least one other user, the method comprising the steps of:

determining a policy of the first user for making the selection, the policy comprising an indication of how the selection should be made, the policy being selectable by the first user;

determining a condition of at least one of the communications network and the terminal;

determining dynamically which streams to select for the first user according to the condition and according to the first user's policy; and, causing only the selected streams to be passed for display on the terminal of the first user, independently of selections made for passing to the other users.

2. The method of claim 1, further comprising the step of:

determining if the selection is restricted by the condition, the policy comprising an indication of how to make the selection when the selection is restricted by the condition.

3. The method of claim 1 wherein the indication comprises relative priorities between desired streams.

4. The method of claim 1 wherein the condition comprises a level of availability of network resources.

5. The method of claim 1 wherein the condition comprises a level of availability of user terminal resources.

6. The method of claim 1, further comprising the step of:

determining activity on one or more of the media streams, the indication comprising an indication of how to make the selection dependent on the activity.

7. The method of claim 6 wherein two or more of the media streams originate from a single source, and the indication of how to make the selection dependent on the activity comprises making the selection of one of the co-originating streams dependent on activity on another of the co-originating streams.

8. The method of claim 1 wherein the step of determining the selected streams is carried out at the first user's terminal.

9. The method of claim 6 further comprising the step of indicating to the network which are the selected streams wherein the step of passing the selected streams comprises transmitting across the network only the selected streams.

10. The method of claim 1 wherein the media streams comprise video streams.

11. The method of claim 1 wherein the network is a multicast capable network.

12. The method of claim 1 wherein the first user also transmits at least one real-time media stream to take part in a conference between multiple users across the communications network.

13. Software, stored on computer readable media, for carrying out the method of claim 1.

14. A method of selecting for display one or more streams from a number of real-time media streams available to be transmitted across a communications network for display on respective terminals of a first, and at least one other user, the method comprising the steps of:

determining a policy of each of the users for making their respective selection, the policy comprising an indication of how the selection should be made, the policy being selectable by the first user;

determining a condition of at least one of the communications network and the terminal;

determining dynamically which streams to select for each user according to the condition and according to the respective policy; and, causing only the selected streams to be passed for display on the terminal of each user, independently of selections made for passing to the other users.

15. Apparatus for selecting for display, one or more real-time media streams available to be transmitted across a communications network for display on terminals of a first user and other users, the apparatus comprising:

means for determining a policy of the first user for making the selection, the policy comprising an indication of how the selection should be made, the policy being selectable by the first user;

means for determining a condition of at least one of the communications network and the terminal;

means for determining dynamically which streams to select for the first user according to the condition and according to the first user's policy; and, means for causing only the selected streams to be passed for display on the terminal of the first user, independently of selections made for passing to the other users.

16. A network node for use in passing real-time media streams across a communications network for display on terminals of a first user and other users, the node comprising apparatus for selecting streams for display on the terminal of the first user, the apparatus comprising:

means for determining a policy of the first user for making the selection, the policy comprising an indication of how the selection should be made, the policy being selectable by the first user;

means for determining a condition of at least one of the communications network and the terminal;

means for determining dynamically which streams to select for the first user according to the condition and according to the first user's policy; and, means for causing only the selected streams to be passed for display on the terminal of the first user, independently of selections made for passing to the other users.

17. A terminal for displaying real-time media streams available to be transmitted across a communications network for display on the terminal and other terminals coupled to the network, the terminal comprising:

means for coupling the terminal to the network to receive the streams from the network, means for determining a policy of a terminal user for making a selection from amongst the streams, the policy comprising an indication of how the selection should be made, the policy being selectable by the first user;

means for determining a condition of at least one of the communications network and the terminal;

means for determining dynamically which streams to select for the first user according to the condition and according to the first user's policy;

means for causing only the selected streams to be passed for display on the terminal of the first user, independently of selections made for passing to the other users; and means for displaying the selected streams.

18. A method of selecting for display one or more streams from a number of real-time media streams available to be transmitted across a multicast capable communications network for display on a users terminal, the method comprising the steps of:

determining a policy of the user for making the selection, the policy comprising an indication of how the selection should be made, the policy being selectable by the user;

determining dynamically at the users terminal which streams to select for the first user according to the user's policy; and, sending a request from the users terminal to the network to transmit only the selected streams for display on the users terminal.

19. Apparatus for selecting for display, one or more real-time media streams available to be transmitted across a communications network for display on terminals of a first user and other users, the apparatus comprising:

circuitry for determining a policy of the first user for making the selection, the policy comprising an indication of how the selection should be made, the policy being selectable by the first user;

circuitry for determining a condition of at least one of the communications network and the terminal;

circuitry for determining dynamically which streams to select for the first user according to the condition and according to the first user's policy; and, circuitry for causing only the selected streams to be passed for display on the terminal of the first user, independently of selections made for passing to the other users.

* * * * *